United States Patent
Jung et al.

(10) Patent No.: US 11,625,040 B2
(45) Date of Patent: Apr. 11, 2023

(54) MOVING ROBOT AND CONTROLLING METHOD

(71) Applicant: LG ELECTRONICS INC., Seoul (KR)

(72) Inventors: Minkuk Jung, Seoul (KR); Jeongwoo Ju, Seoul (KR)

(73) Assignee: LG ELECTRONICS INC., Seoul (KR)

(*) Notice: Subject to any disclaimer, the term of this patent is extended or adjusted under 35 U.S.C. 154(b) by 73 days.

(21) Appl. No.: 17/196,070

(22) Filed: Mar. 9, 2021

(65) Prior Publication Data
US 2021/0286367 A1  Sep. 16, 2021

(30) Foreign Application Priority Data
Mar. 10, 2020  (KR) .......... 10-2020-0029749

(51) Int. Cl.
*G05D 1/02* (2020.01)

(52) U.S. Cl.
CPC .......... *G05D 1/0217* (2013.01); *G05D 1/0219* (2013.01); *G05D 1/0225* (2013.01); *G05D 1/0274* (2013.01); *G05D 2201/0208* (2013.01)

(58) Field of Classification Search
CPC .. G05D 1/0217; G05D 1/0219; G05D 1/0225; G05D 1/0274
See application file for complete search history.

(56) References Cited

U.S. PATENT DOCUMENTS

| 9,063,547 B2 | 6/2015 | Yamamura et al. |
| 2004/0117079 A1 | 6/2004 | Hulden |
| 2013/0206177 A1* | 8/2013 | Burlutskiy .......... A47L 11/4011 15/319 |
| 2017/0344007 A1* | 11/2017 | Song ....................... G06N 7/005 |
| 2021/0200220 A1* | 7/2021 | Zhu ....................... G05D 1/0088 |

FOREIGN PATENT DOCUMENTS

| JP | 2005-032196 A | 2/2005 |
| KR | 10-2009-0126414 A | 12/2009 |
| KR | 10-2013-0101913 A | 9/2013 |
| KR | 10-2015-0125508 A | 11/2015 |
| KR | 10-2017-0134165 A | 12/2017 |

OTHER PUBLICATIONS

PCT Search Report dated Jun. 28, 2021 issued in Application PCT/KR2021/002928.

* cited by examiner

*Primary Examiner* — Vivek D Koppikar
*Assistant Examiner* — Godfrey Aleksander Maciorowski
(74) *Attorney, Agent, or Firm* — KED & Associates LLP

(57) ABSTRACT

A moving robot according to an aspect of the present invention includes a body configured to define an exterior, a travelling unit configured to move the body against a travelling surface of a travelling area, a storage configured to store a grid map corresponding to a travelling area and cost information of grids included in the grid map, and a controller configured to generate a movement route based on the cost information, control the travelling unit to travel according to the generated movement route, and increase a stay cost of a grid corresponding to a route that has passed during the travelling and control the storage to store the increased stay cost.

16 Claims, 20 Drawing Sheets

FIG. 10

MOVING ROBOT AND CONTROLLING METHOD

CROSS-REFERENCE TO RELATED APPLICATION

This application claims priority under 35 U.S.C. § 119 to Korean Application No. 10-2020-0029749 filed Mar. 10, 2020, whose entire disclosure is hereby incorporated by reference.

BACKGROUND

1. Field

The present invention relates to an autonomous travelling moving robot and a method of controlling the moving robot, and to a pattern travelling of a moving robot with high efficiency and reliability in an outdoor environment.

2. Background

Robots were developed for industrial use and prompted automation of production operations. Recently, they are being used more widely, for example, in the medical industry and the aerospace industry. There are even domestic robots used for household chores. Among such robots, a type of robot capable of traveling on its own is called a moving robot. A typical example of a moving robot used for a home's outdoor environment is a lawn mower robot.

For a moving robot travelling in an indoor space, a movable area is restricted by a wall or furniture, and, for a moving robot travelling an outdoor space, it is necessary to set a movable area in advance. In addition, a movable area needs to be limited to allow the lawn mower robot to travel on a grass area.

In a prior art 1 (Korean Patent Application Publication No. 2015-0125508), a wire for setting an area to be travelled by a lawn mower robot may be installed in the lawn mower robot, and the lawn mower robot may sense a magnetic field formed by currents flowing by the wire and move in an area set by the wire.

In addition, when limiting movement by setting a border, a virtual wall may be set by transmitting a signal in a beacon method to limit the movement of the moving robot.

In this way, the lawn mower robot travels within a limited travel area and performs lawn mowing.

The lawn mower robot may mow the lawn while traveling in a travel area randomly, but there is a problem in that efficiency is deteriorated by repeatedly visiting the same place.

Prior art 2 (U.S. Pat. No. 9,063,547) returns to a plurality of preset trajectories according to a magnetic strength of the area wires arranged at the periphery of the work area in order to solve the problem of running the same trajectory whenever returning to a charger.

The prior art 2 has a limitation that it cannot be applied to a wireless method without a wire, and cannot be used when travelling other than return such as lawn mowing work.

BRIEF DESCRIPTION OF THE DRAWINGS

The embodiments will be described in detail with reference to the following drawings in which like reference numerals refer to like elements wherein:

FIGS. 9 to 19*c* are views referenced for description of a method for controlling a moving robot according to an embodiment of the present invention.

DETAILED DESCRIPTION

Figure 1:
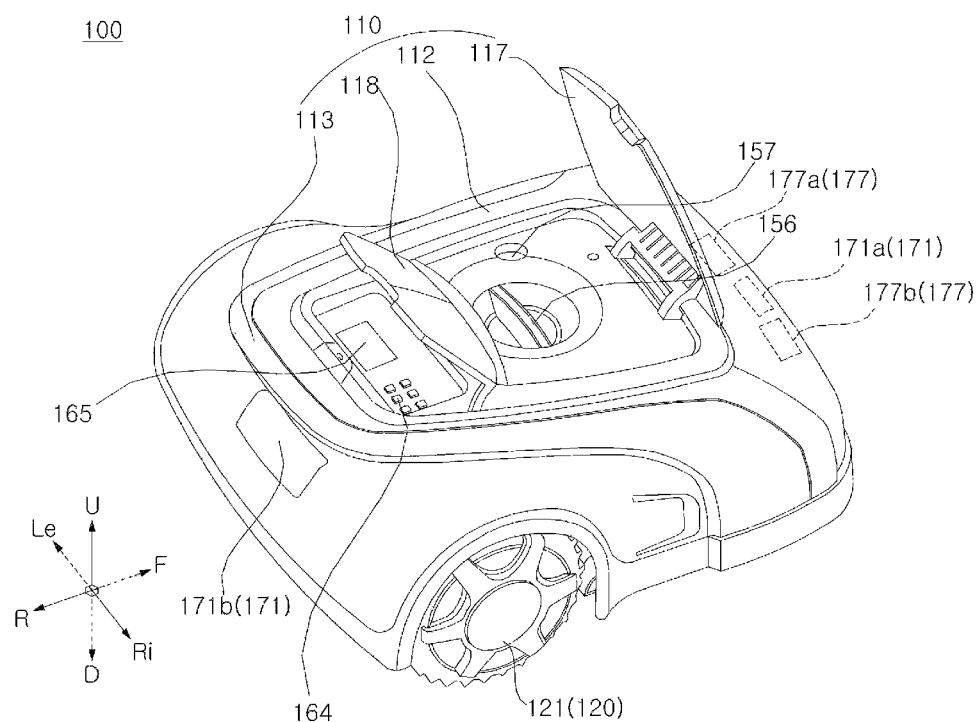
FIG. 1 is a perspective view of a moving robot 100 according to the present disclosure.
Figure 2:
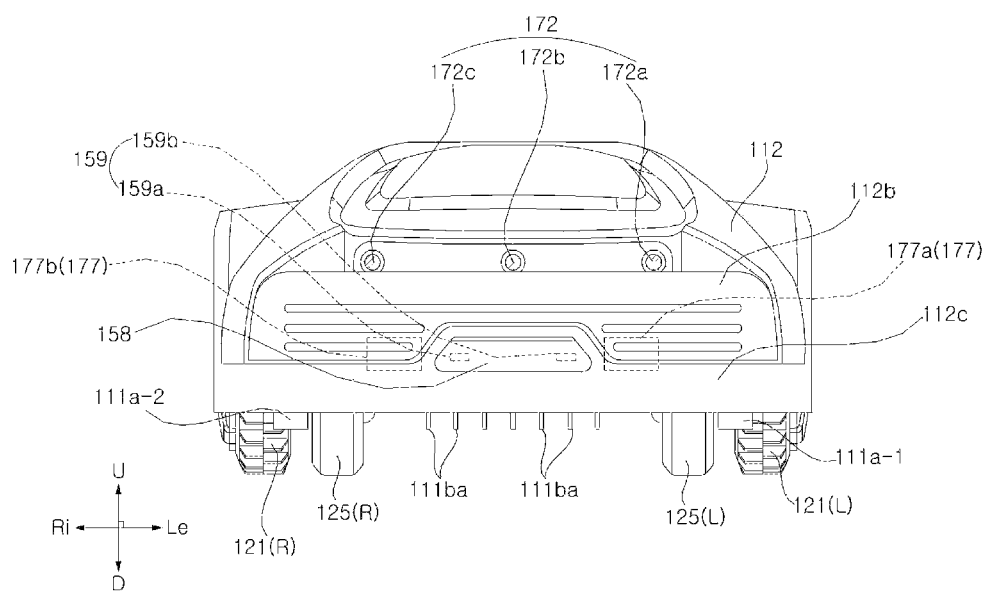
FIG. 2 is a front view of the moving robot of FIG. 1.
Figure 3:
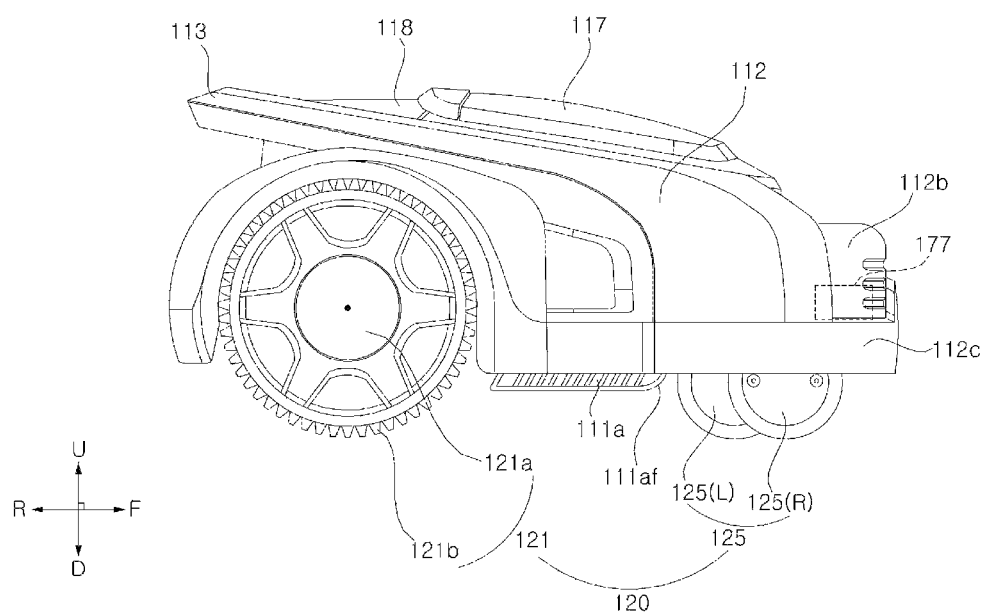
FIG. 3 is a right side view of the moving robot shown in FIG. 1.
Figure 4:
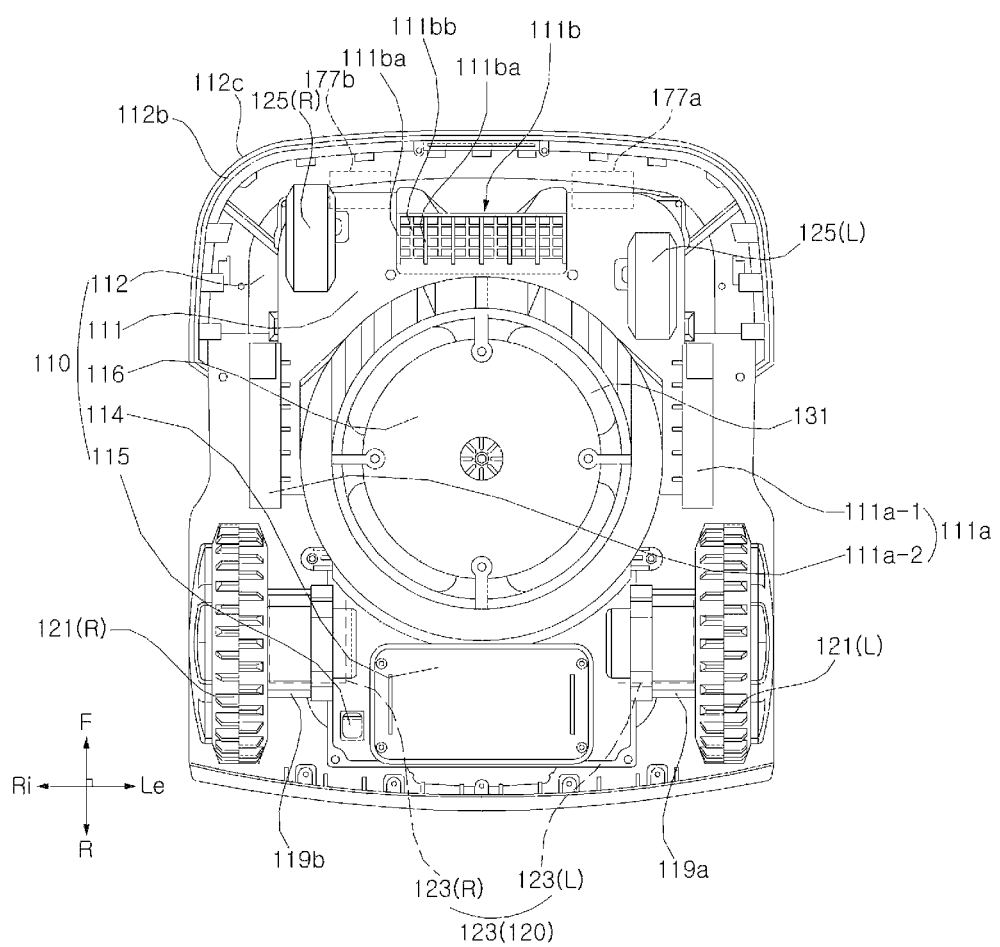
FIG. 4 is a bottom view of the moving robot 100 shown in FIG. 1.

The terms "forward (F)/rearward (R)/upward (U)/downward (D)/indoor (I)/outdoor (O)" mentioned in the following description are defined as shown in the drawings. However, the terms are used merely to clearly understand the present invention, and therefore the above-mentioned directions may be differently defined.

The terms "first", "second" etc. are used to distinguish elements, and not related to a sequence, importance levels, or a master-servant relationship of elements. For example, only a second element may be included without a first element.

Hereinafter, a moving robot is described as a lawn mower 100 with reference to FIGS. 1 to 6, but the present disclosure is not necessarily limited thereto.

With reference to FIGS. 1 to 4, a moving robot 100 includes a body 110 that defines an exterior of the moving robot 100. The body 110 forms an inner space. The moving robot 100 includes a travelling unit 120 that moves the body 110 against a travel surface. The moving robot 100 includes an operation unit 130 that performs a predetermined operation.

The body 110 includes a frame 111 to which a driving motor module 123, which will be described later, is fixed. A blade motor 132, which will be described later, is fixed to the frame 111. The frame 111 supports a battery which will be described later. The frame 111 provides a structure which supports even other components which are not mentioned herein. The frame 111 is supported by an auxiliary wheel 125 and a driving wheel 121.

The body 110 includes a lateral blocking part 111*a* which prevent a user's finger from entering a blade 131 from a side of the blade 131. The lateral blocking part 111*a* is fixed to the frame 111. The lateral blocking part 111*a* is projected downward, compared to a button surface of an other part of the frame 111. The lateral blocking part 111*a* is arranged to cover an upper side of a space between the driving wheel 121 and the auxiliary wheel 125.

A pair of lateral blocking parts 111*a*-1 and 111*a*-2 is arranged on the left and right sides to the blade 131. The lateral blocking part 111*a* is spaced a predetermined distance apart from the blade 131.

A front surface 111*af* of the lateral blocking part 111*a* is formed in a round shape. The front surface 111*af* forms a surface that is bent in a round manner upwardly in a forward direction from a bottom surface of the lateral blocking part 111*a*. By use of the shape of the front surface 111*af*, the lateral blocking parts 111*a* is able to easily go over an obstacle of a predetermined height or lower thereunder when the moving robot 100 moves forward.

The body 110 includes a front blocking part 111b which prevents a user's finger from entering between the blade 131 from the front of the blade 131. The front blocking part 111b is fixed to the frame 111. The front blocking part 111b is arranged to partially cover an upper side of a space between a pair of auxiliary wheels 125(L) and 125(R).

The front blocking part 111b includes a projected rib 111ba which is projected downward compared to a bottom surface of another part of the frame 111. The projected rib 111ba extends in a front-rear direction. An upper portion of the projected rib 111ba is fixed to the frame 111, and a lower portion of the projected rib 111ba forms a free end.

A plurality of projected ribs 111ba may be spaced apart leftward and rightward from each other. The plurality of projected ribs 111ba may be arranged in parallel to each other. A gap is formed between two adjacent projected ribs 111ba.

A front surface of the projected ribs 111ba is formed in a round shape. The front surface of the projected rib 111ba forms a surface that is bent in a round manner upwardly in a forward direction from a bottom surface of the projected rib 111ba. By use of the shape of the front surface of the projected rib 111ba, the projected rib 111ba is able to easily go over an obstacle of a predetermined height or lower thereunder when the moving robot 100 moves forward.

The front blocking part 111b includes an auxiliary rib 111bb which reinforces rigidity. The auxiliary ribs 111bb for reinforcing rigidity of the front blocking part 111b is arranged between upper portions of two adjacent projected ribs 111ba. The auxiliary rib 111bb may be projected downward and may be in a lattice shape which extends.

In the frame 111, a caster which supports the auxiliary wheel 125 rotatably is arranged. The caster is arranged rotatable with respect to the frame 111. The caster is disposed rotatable about a vertical axis. The caster is disposed in a lower side of the frame 111. The caster is provided as a pair of casters corresponding to the pair of auxiliary wheels 125.

The body 110 includes a case 112 which covers the frame 111 from above. The case 112 defines a top surface and front/rear/left/right surfaces of the moving robot 100.

The body 110 may include a case connection part (not shown) which fixes the case 112 to the frame 111. An upper portion of the case connection part may be fixed to the case 112. The case connection part may be arranged movable with respect to the frame 111. The case connection part may be arranged movable only upwardly and downwardly with the frame 111. The case connection part may be provided movable in a predetermined range. The case connection part moves integrally with the case 112. Accordingly, the case 112 is movable with respect to the frame 111.

The body 110 includes a bumper 112b which is disposed at the front. The bumper 112b absorbs an impact upon collision with an external obstacle. At a front surface of the bumper 112b, a bumper groove recessed rearward and elongated in a left-right direction may be formed. The bumper groove may be provided as a plurality of bumper grooves spaced apart from each other in an upward-downward direction. A lower end of the projected rib 111ba is positioned lower than a lower end of the auxiliary rib 111bb.

The front surface and the left and right surfaces of the bumper 112b are connected. The front surface and the left and right surfaces of the bumper 112b are connected in a round manner.

The body 110 may include an auxiliary bumper 112c which is disposed embracing an exterior surface of the bumper 112b. The auxiliary bumper 112c is coupled to the bumper 112b. The auxiliary bumper 112c embraces lower portions of the front, left, and right surfaces of the bumper 112b. The auxiliary bumper 112c may cover the lower half portions of the front, left, and right surfaces of the bumper 112b.

The front surface of the auxiliary bumper 112c is disposed ahead of the front surface of the bumper 112b. The auxiliary bumper 112c forms a surface projected from a surface of the bumper 112b.

The auxiliary bumper 112c may be formed of a material which is advantageous in absorbing impact, such as rubber. The auxiliary bumper 112c may be formed of a flexible material.

The frame 111 may be provided with a movable fixing part (not shown) to which the bumper 112b is fixed. The movable fixing part may be projected upward of the frame 111. The bumper 112b may be fixed to an upper portion of the movable fixing part.

The bumper 112b may be disposed movable in a predetermined range with the frame 111. The bumper 112b may be fixed to the movable fixing part and thus movable integrally with the movable fixing part.

The movable fixing part may be disposed movable with respect to the frame 111. The movable fixing part may be rotatable about a virtual rotation axis in a predetermined range with the frame 111. Accordingly, the bumper 112b may be movable integrally with the movable fixing part with respect to the frame 111.

The body 110 includes a handle 113. The handle 113 may be disposed at the rear of the case 112.

The body 110 includes a battery slot 114 which a battery is able to be inserted into and separated from. The battery slot 114 may be disposed at a bottom surface of the frame 111. The battery slot 114 may be disposed at the rear of the frame 111.

The body 110 includes a power switch 115 to turn on/off power of the moving robot 100. The power switch 115 may be disposed at the bottom surface of the frame 111.

The body 110 includes a blade protector 116 which hides the lower side of the central portion of the blade 131. The blade protector 116 is provided to expose centrifugal portions of blades of the blade 131 while hiding the central portion of the blade 131.

The body 110 includes a first opening and closing door 117 which opens a portion in which a height adjuster 156 and a height indicator 157 are arranged. The first opening and closing door 117 is hinge-coupled to the case 112 to be opened and closed. The first opening and closing door 117 is arranged in a top surface of the case 112.

The first opening and closing door 117 is formed in a plate shape, and, when closed, covers the top of the height adjuster 156 and the height indicator.

The body 110 includes a second opening and closing door 118 which opens and closes a portion in which a display module 165 and an input unit 164 is arranged. The second opening and closing door 118 is hinge-coupled to the case 112 to be opened and closed. The second opening and closing door 118 is arranged in a top surface of the case 112. The second opening and closing door 118 is disposed behind the first opening and closing door 117.

The second opening and closing door 118 is formed in a plate shape, and, when closed, covers the display module 165 and the input unit 164.

An available opening angle of the second opening and closing door 118 is predetermined to be smaller than an available opening angle of the first opening and closing door 117. In doing this, even when the second opening and closing door 118 is opened, a user is allowed to easily open the first opening and closing door 117 and easily manipulate the height adjuster 156. In addition, even when the second opening and closing door 118 is opened, the user is allowed to visually check content of the height display 157.

For example, the available opening angle of the first opening and closing door 117 may be about 80 to 90 degrees with reference to the closed state of the first opening 117. For example, the available opening angle of the second opening and closing door 118 may be about 45 to 60 degrees with reference to the closed state of the second opening and closing door 118.

A rear of the first opening and closing door 117 is lifted upward from a front thereof to thereby open the first opening and closing door 117, and a rear of the second opening and closing door 118 is lifted upward from a front thereof to thereby open the second opening and closing door 118. In doing so, even while the lawn mower 100 moves forward, a user located in an area behind the lawn mower 100, which is a safe area, is able to open and close the first opening and closing door 117 and the second opening and closing door 118. In addition, in doing so, opening of the first opening and closing door 117 and opening of the second opening and closing door 118 may be prevented from intervening each other.

The first opening and closing door 117 may be rotatable with respect to the case 112 about a rotation axis which extends from the front of the first opening and closing door 117 in a left-right direction. The second opening and closing door 118 may be rotatable with respect to the case 112 about a rotation axis which extends from the front of the second opening and closing door 118 in the left-right direction.

The body 110 may include a first motor housing 119*a* which accommodates a first driving motor 123(L), and a second motor housing 119*b* which accommodates a second driving motor 123(R). The first motor housing 119*a* may be fixed to the left side of the frame 111, and the second motor housing 119*b* may be fixed to the right side of the frame 111. A right end of the first motor housing 119*a* is fixed to the frame 111. A left end of the second motor housing 119*b* is fixed to the frame 111.

The first motor housing 119*a* is formed in a cylindrical shape that defines a height in the left-right direction. The second motor housing 119*b* is formed in a cylindrical shape that defines a height in the left-right direction.

The traveling unit 120 includes the driving wheel 121 that rotates by a driving force generated by the driving motor module 123. The traveling unit 120 may include at least one pair of driving wheels 121 which rotate by a driving force generated by the driving motor module 123. The driving wheel 121 may include a first wheel 121(L) and a second wheel 121(R), which are provided on the left and right sides and rotatable independently of each other. The first wheel 121(L) is arranged on the left side, and the second wheel 121(R) is arranged on the right side. The first wheel 121(L) and the second wheel 121(R) are spaced apart leftward and rightward from each other. The first wheel 121(L) and the second wheel 121(R) are arranged in a lower side at the rear of the body 110.

The first wheel 121(L) and the second wheel 121(R) are rotatable independently of each other so that the body 110 is rotatable and forward movable relative to a ground surface. For example, when the first wheel 121(L) and the second wheel 121(R) rotate at the same speed, the body 110 is forward movable relative to the ground surface. For example, when a rotation speed of the first wheel 121(L) is faster than a rotation speed of the second wheel 121(R) or when a rotation direction of the first wheel 121(L) and a rotation direction of the second wheel 121(R) are different from each other, the body 110 is rotatable against the ground surface.

The first wheel 121(L) and the second wheel 121(R) may be formed to be greater than the auxiliary wheel 125. A shaft of the first driving motor 123(L) may be fixed to the center of the first wheel 121(L), and a shaft of the second driving motor 123(R) may be fixed to the center of the second wheel 121(R).

The driving wheel 121 includes a wheel circumference part 121*b* which contacts the ground surface. For example, the wheel circumference part 121*b* may be a tire. In the wheel circumference part 121*b*, a plurality of projections for increasing a frictional force with the ground surface may be formed.

The driving wheel 121 may include a wheel fame (not shown), which fixes the wheel circumference part 121*b* and receives a driving force for the motor 123. A shaft of the motor 123 is fixed to the center of the wheel frame to receive a rotation force. The wheel circumference part 121*b* is arranged surrounding a circumference of the wheel frame.

The driving wheel 121 includes a wheel cover 121*a* which covers an exterior surface of the wheel frame. With reference to the wheel frame, the wheel cover 121*a* is arranged in a direction opposite to a direction in which the motor 123 is arranged. The wheel cover 121*a* is arranged at the center of the wheel circumference part 121*b*.

The traveling unit 120 includes the driving motor module 123 which generates a driving force. The traveling unit 120 includes the driving motor module 123 which provides a driving force for the driving wheel 121. The driving motor module 123 includes the first driving motor 123(L) which provides a driving force for the first wheel 121(L), and the second driving motor 123(R) which provides a driving force for the second wheel 121(R). The first driving motor 123(L) and the second driving motor 123(R) may be spaced apart leftward and rightward from each other. The first driving motor 123(L) may be disposed on the left side of the second driving motor 123(R).

The first driving motor 123(L) and the second driving motor 123(R) may be arranged at a lower side of the body 110. The first driving motor 123(L) and the second driving motor 123(R) may be arranged at the rear of the body 110.

The first driving motor 123(L) may be arranged on the right side of the first wheel 121(L), and the second driving motor 123(R) is arranged on the left side of the second wheel 121(R). The first driving motor 123(L) and the second driving motor 123(R) are fixed to the body 110.

The first driving motor 123(L) may be arranged inside the first motor housing 119*a*, with a motor shaft being projected leftward. The second driving motor 123(R) may be arranged inside the second motor housing 119*b*, with a motor shaft being projected rightward.

In this embodiment, the first wheel 121(L) and the second wheel 121(R) may be connected to a rotation shaft of the first driving motor 123(L) and a rotation shaft of the second driving motor 123(R), respectively. Alternatively, a component of a shaft or the like may be connected to the first wheel 121(L) and the second wheel 121(R). Alternatively, a rotation force of the motor 123(L) or 123(R) may be transferred to the wheel 121*a* or 121 *b* by a gear or a chain.

The traveling unit 120 may include the auxiliary wheel 135 which supports the body 110 together with the driving wheel 121. The auxiliary wheel 125 may be disposed ahead of the blade 131. The auxiliary wheel 125 is a wheel which does not receives a driving force generated by a motor, and the auxiliary wheel 125 auxiliarily supports the body 110 against the ground surface. The caster supporting a rotation shaft of the auxiliary wheel 125 is coupled to the frame 111 to be rotatable about a vertical axis. There may be provided a first auxiliary wheel 125(L) arranged on the left side, and a second auxiliary wheel 125(R) arranged on the right side.

The operation unit 130 is provided to perform a predetermined operation. The operation unit 120 is arranged at the body 110.

In one example, the operation unit 130 may be provided to perform an operation such as cleaning or lawn mowing. In another example, the operation unit 130 may be provided to perform an operation such as transferring an object or finding an object. In yet another embodiment, the operation unit 130 may perform a security function such as sensing an intruder or a dangerous situation in the surroundings.

In this embodiment, the operation unit 130 is described as moving lawn, but there may be various types of operation performed by the operation unit 120 and not limited to this embodiment.

The operation unit 130 may include the blade 131 which are rotatably provided to mow lawn. The operation unit 130 may include a blade motor 132 which provides a rotation force for the blade 131.

The blade 131 is arranged between the driving wheel 121 and the auxiliary wheel 125. The blade 131 is arranged on a lower side of the body 110. The blade 131 is exposed from the lower side of the body 110. The blade 131 mows lawn by rotating about a rotation shaft which extends in an upward-downward direction.

A blade motor 132 may be arranged ahead of the first wheel 121(L) and the second wheel 121(R). The blade motor 132 is disposed in a lower side of the center in the inner space of the body 110.

The blade motor 132 may be disposed at the rear of the auxiliary wheel 125. The blade motor 132 may be arranged in a lower side of the body 110. A rotational force of the motor axis is transferred to the blade 131 using a structure such as a gear.

The moving robot 100 includes a battery (not shown) which provides power for the driving motor module 123. The battery provides power to the first driving motor 123(L). The battery provides power for the second driving motor 123(R). The battery may provide power for the blade motor 132. The battery may provide power for a controller 190, an azimuth angle sensor 176, and an output unit 165. The battery may be arranged in a lower side of the rear in the indoor space of the body 110.

The moving robot 100 is able to change a height of the blade 131 from the ground, and change a lawn cutting height. The moving robot 100 includes the height adjuster 156 by which a user is able to change a height of the blade 131. The height adjuster 156 may include a rotatable dial and may change the height of the blade 131 by rotating the dial.

The moving robot 100 includes the height indicator 157 which displays a degree of the height of the blade 131. When the height of the blade 131 is changed upon manipulation of the height adjuster 156, the height displayed by the height display 157 is also changed. For example, the height display 157 may display a height value of grass that is expected after the moving robot 100 mows lawn with the current height of the blade 131.

The moving robot 100 includes a docking insertion part 158 which is connected to a docking device 200 when the moving robot 100 is docked to the docking device 200. The docking insertion part 158 is recessed such that a docking connection part 210 of the docking device 200 is inserted into the docking insertion part 158. The docking insertion part 158 is arranged in the front surface of the body 110. Due to connection of the docking insertion part 158 and the docking connection part 210, the moving robot 100 may be guided to a correct position upon a need of charge.

The moving robot 100 may include a charging counterpart terminal 159 which is disposed at a position to be in contact with a charging terminal 211, which will be described later, when the docking connection part 210 is inserted into the docking insertion part 158. The charging counterpart terminal 159 includes a pair of charging counterpart terminals which are disposed at positions corresponding to a pair of charging terminals 211a and 211b. The pair of charging counterpart terminals 159a and 159b may be disposed on the left and right sides of the docking insertion part 158.

A terminal cover (not shown) for openably/closably covering the pair of charging terminals 211a and 211b may be provided. While the moving robot 100 travels, the terminal cover may cover the docking insertion part 158 and the pair of charging terminals 211a and 211b. When the moving robot 100 is connected with the docking device 200, the terminal cover may be opened, and therefore, the docking insertion part 158 and the pair of charging terminals 211a and 211b may be exposed.

Figure 5:
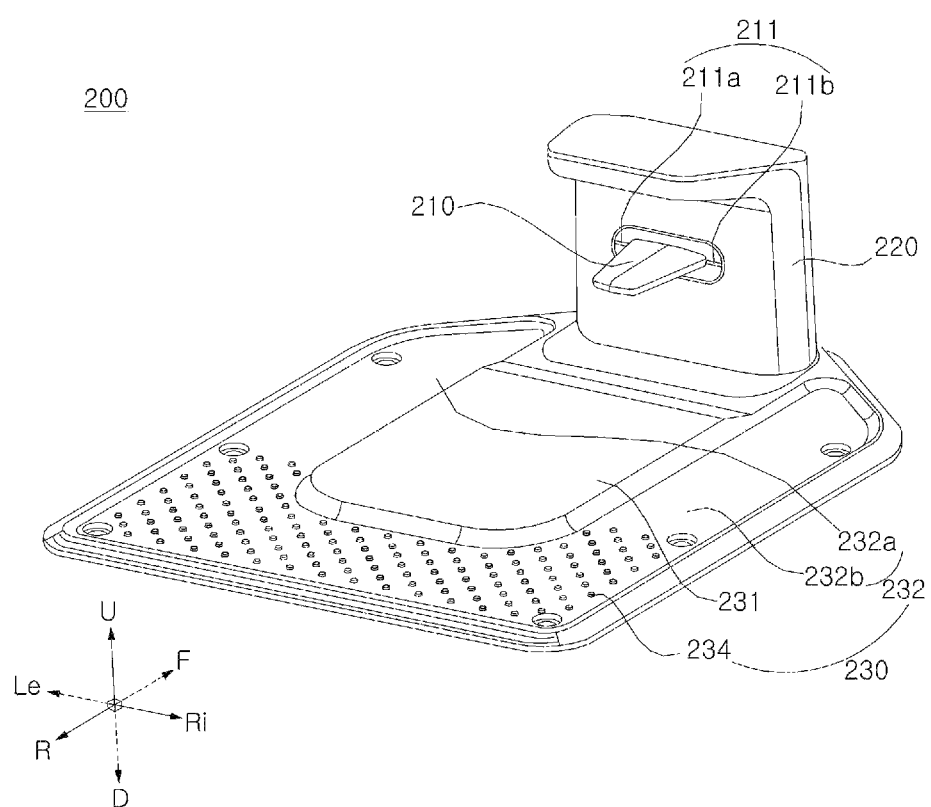
FIG. 5 is a perspective view of a docking device for docking the moving robot shown in FIG. 1.
Figure 6:
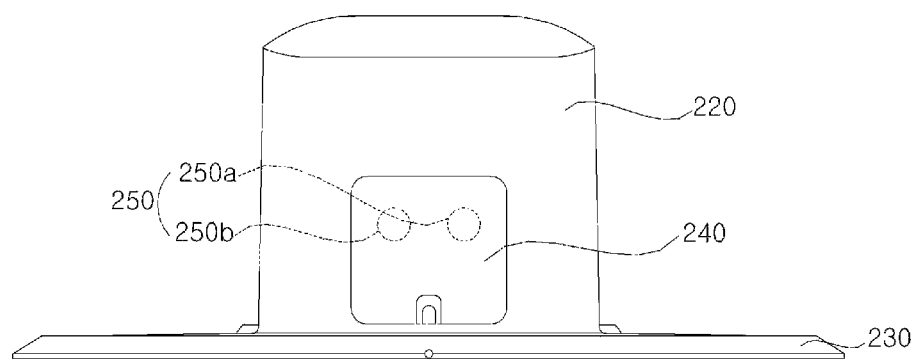
FIG. 6 is a front view of the docking device shown in FIG. 5.
Figure 6:
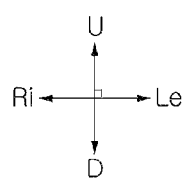

Meanwhile, referring to FIGS. 5 to 6, the docking device 200 includes a docking base 230 disposed at a floor, and a docking support 220 projected upwardly from the front of the docking base 230. The docking device 200 includes the docking connection part 210 which is inserted into the docking insertion part 158 to charge the moving robot 100. The docking connection part 210 may be projected rearward of the docking support 220.

The docking connection part 210 may be formed to have a vertical thickness smaller than a horizontal thickness. A horizontal width of the docking connection part 210 may be narrowed toward the rear. As viewed from above, the docking connection part 210 is broadly in a trapezoidal shape. The docking connection part 210 is vertically symmetrical. The rear of the docking connection part 210 forms a free end, and the front of the docking connection part 210 is fixed to the docking support 220. The rear of the docking connection part 210 may be formed in a round shape.

When the docking connection part 210 is fully inserted into the docking insertion part 158, charging of the moving robot 100 by the docking deice 200 may be performed.

The docking device 200 includes the charging terminal 211 to charge the moving robot 100. As the charging terminal 211 and the charging counterpart terminal 159 of the moving robot 100 are brought into contact with each other, charging power may be supplied from the docking device 200 to the moving robot 100.

The charging terminal 211 includes a contact surface facing rearward, and the charging counterpart terminal 159 includes a contact counterpart surface facing forward. As the contact surface of the charging terminal 211 is brought into contact with the contact counterpart surface of the charging counterpart terminal 159, power of the docking device 200 is connected with the moving robot 100.

The charging terminal 211 may include a pair of charging terminals 211a and 211b which form a positive polarity (+) and a negative polarity (−), respectively. The first charging terminal 211a is provided to come into contact with the first charging counterpart terminal 159a, and the second charging terminal 211b is provided to come into contact with the second charging counterpart terminal 159b.

The pair of charging terminals 211a and 211b may be arranged with the docking connection part 210 therebetween. The pair of charging terminals 211a and 211b may be arranged on the left and right sides of the docking connection part 210.

The docking base 230 includes a wheel guard 232 on which the driving wheel 121 and the auxiliary wheel 125 of the moving robot 100 are to be positioned. The wheel guard 232 includes a first wheel guard 232a which guides movement of the first auxiliary wheel 125(L), and a second wheel guard 232b which guides movement of the second auxiliary wheel 125(R). Between the first wheel guard 232a and the second wheel guard 232b, there is a central base 231 which is convex upwardly. The docking base 230 includes a slip prevention part 234 to prevent slipping of the first wheel 121(L) and the second wheel 121(R). The slip prevention part 234 may include a plurality of projections which are projected upwardly.

Meanwhile, a wire (not shown) for setting a border of a travel area of the moving root 100 may be provided. The wire may generate a predetermined border signal. By detecting the border signal, the moving robot 100 is able to recognize the border of the travel area set by the wire.

For example, as a predetermined current is allowed to flow along the wire, a magnetic field may be generated around the wire. The generated magnetic field is the aforementioned border signal. As an alternating current with a predetermined pattern of change are allowed to flow in the wire, a magnetic field generated around the wire may change in the predetermined pattern of change. Using a border signal detector 177 for detecting a magnetic field, the moving robot 100 may recognize that the moving robot 100 has approached the wire within a predetermined distance, and accordingly, the moving robot 100 may travel only in a travel area within a border set by the wire.

The docking unit 200 may play a role of transferring a predetermined current to the wire. The docking device 200 may include a wire terminal 250 connected to the wire. Both ends of the wire may be connected to a first wire terminal 250a and a second wire terminal 250b. Through the connection between the wire and the wire terminal 250, a power supply of the docking device 200 may supply a current to the wire.

The wire terminal 250 may be disposed at the front (F) of the docking device 200. That is, the wire terminal 250 may be disposed at a position opposite to a direction in which the docking connection part 210 is projected. The wire terminal 250 may be disposed in the docking support 220. The first wire terminal 250a and the second wire terminal 250b may be spaced apart leftward and rightward from each other.

The docking device 200 may include a wire terminal opening and closing door 240 which openably/closably covers the wire terminal 250. The wire terminal opening and closing door 240 may be disposed at the front (F) of the docking support 220. The wire terminal opening and closing door 240 may be hinge-coupled to the docking support 220 to be opened and closed by rotation.

Figure 7:
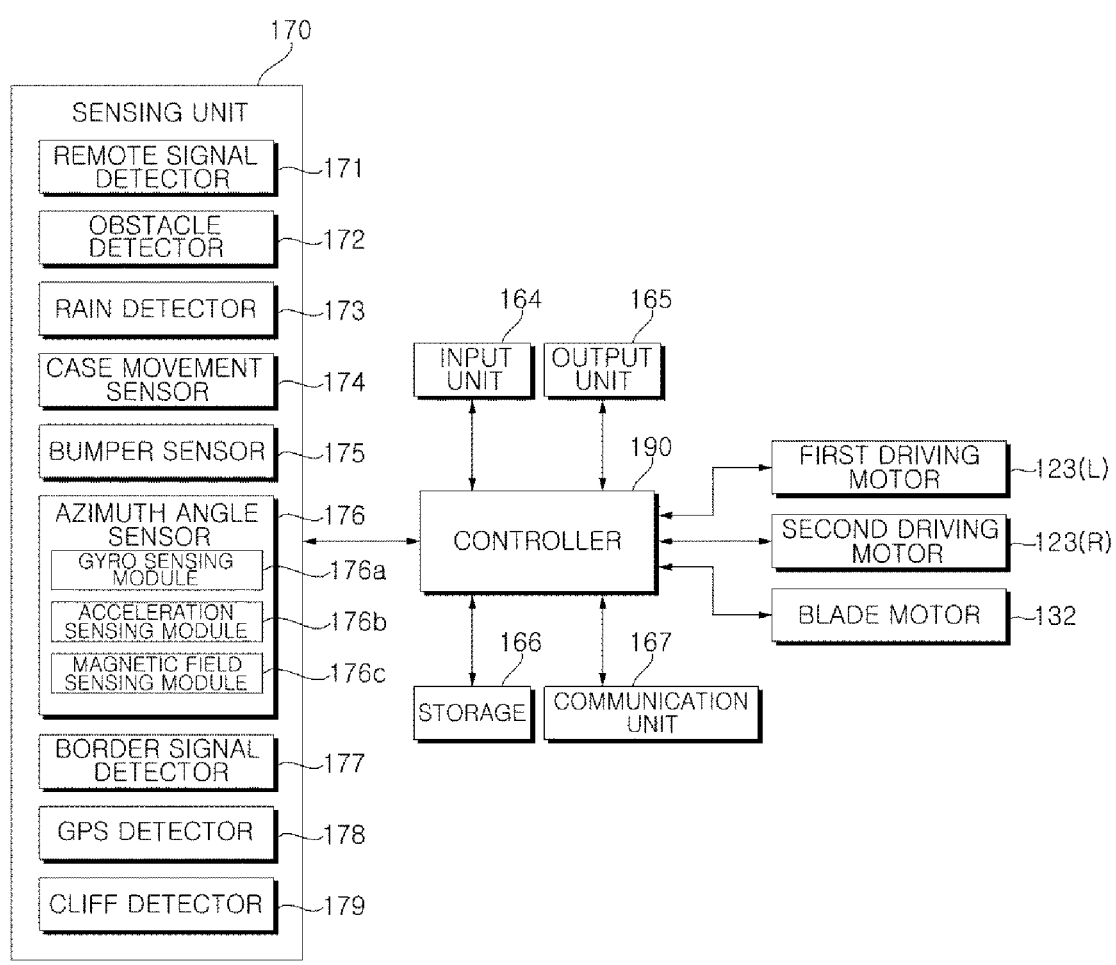
FIG. 7 is a block diagram illustrating a control relation of the moving robot shown in FIG. 1.

Meanwhile, referring to FIG. 7, the moving robot 100 may include the input unit 164 through which various instructions from a user is allowed to be input. The input unit 164 may include a button, a dial, a touch-type display, etc. The input unit 164 may include a microphone to recognize a voice. In this embodiment, a plurality of buttons is arranged in an upper side of the case 112.

The moving robot 100 may include the output unit 165 to output various types of information to a user. The output unit 165 may include a display module which displays visual information. The output unit 165 may include a speaker (not shown) which outputs audible information.

In this embodiment, the display module 165 outputs an image in an upward direction. The display module 165 is arranged in the upper side of the case 112. In one example, the display module 165 may include a thin film transistor Liquid-Crystal Display (LCD). In addition, the display module 165 may be implemented using various display panels such as a plasma display panel, an organic light emitting diode display panel, etc.

The moving robot 100 includes a storage 166 which stores various types of information. The storage 166 stores various types of information necessary to control the moving robot 100, and the storage 166 may include a volatile or non-volatile recording medium. The storage 166 may store information input through the input unit 164 or information received through a communication unit 167. The storage 166 may store a program required to control the moving robot 100.

The moving robot 100 may include the communication unit 167 to communicate with an external device (a terminal and the like), a server, a router, etc. For example, the communication unit 167 may be capable of performing wireless communication with a wireless communication technology such as IEEE 802.11 WLAN, IEEE 802.15 WPAN, UWB, Wi-Fi, Zigbee, Z-wave, Blue-Tooth, etc. The communication unit 167 may differ depending on a target device to communication or a communication method of a server.

The moving robot 100 includes a sensing unit 170 which senses a state of the moving robot 100 or information relating to an environment external to the moving robot 100. The sensing unit 170 may include at least one of a remote signal detector 171, an obstacle detector 172, a rain detector 173, a case movement sensor 174, a bumper sensor 175, an azimuth angle sensor 176, a border signal detector 177, a Global Positioning System (GPS) detector 178, or a cliff detector 179.

The remote signal detector 171 receives an external remote signal. Once a remote signal from an external remote controller is transmitted, the remote signal detector 171 may receive the remote signal. For example, the remote signal may be an infrared signal. The signal received by the remote signal detector 171 may be processed by a controller 190.

A plurality of remote signal detectors 171 may be provided. The plurality of remote signal detectors 171 may include a first remote signal detector 171a disposed at the front of the body 110, and a second remote signal detector 171b disposed at the rear of the body 110. The first remote signal detector 171a receives a remote signal transmitted from the front. The second remote signal detector 171b receives a remote signal transmitted from the rear.

The obstacle detector 172 senses an obstacle around the moving robot 100. The obstacle detector 172 may sense an obstacle in the front. A plurality of obstacle detectors 172a, 172b, and 172c may be provided. The obstacle detector 172 is disposed at a front surface of the body 110. The obstacle detector 172 is disposed higher than the frame 111. The obstacle detector 172 may include an infrared sensor, an ultrasonic sensor, a Radio Frequency (RF) sensor, a geomagnetic sensor, a Position Sensitive Device (PSD) sensor, etc.

The rain detector 173 senses rain when it rains in an environment where the moving robot 100 is placed. The rain detector 173 may be disposed in the case 112.

The case movement sensor 174 senses movement of the case connection part. If the case 112 is lifted upward from the frame 111, the case connection part moves upward and accordingly the case movement sensor 174 senses the lifted state of the case 112. If the case movement sensor 174 senses the lifted state of the case 112, the controller 190 may perform a control action to stop operation of the blade 131. For example, if a user lifts the case 112 or if a considerable-sized obstacle underneath lifts the case 112, the case movement sensor 174 may sense the lift.

The bumper sensor 175 may sense rotation of the movable fixing part. For example, a magnet may be disposed in one side of the bottom of the movable fixing part, and a sensor for sensing a change in a magnetic field of the magnet may be disposed in the frame. When the movable fixing part rotates, the bumper sensor 175 senses a change in the magnetic field of the magnet. Thus, the bumper sensor 175 capable of sensing rotation of the movable fixing part may be implemented. When the bumper 112b collides with an external obstacle, the movable fixing part rotates integrally with the bumper 112b. As the bumper sensor 175 senses the rotation of the movable fixing part, the bumper sensor 175 may sense the collision of the bumper 112b.

The sensing unit 170 includes a tilt information acquisition unit 180 which acquires tilt information on a tilt of a traveling surface (S). By sensing a tilt of the body 110, the tilt information acquisition unit 180 may acquire the tilt information on inclination of the traveling surface (S) on which the body 110 is placed. In one example, the tilt information acquisition unit 180 may include a gyro sensing module 176a. The tilt information acquisition unit 180 may include a processing module (not shown) which converts a sensing signal from the gyro sensing module 176a into the tilt information. The processing module may be implemented as an algorithm or a program which is part of the controller 190. In another example, the tilt information acquisition unit 180 may include a magnetic field sensing module 176c, and acquire the tilt information based on sensing information about the magnetic field of the Earth.

The gyro sensing module 176a may acquire information on a rotational angular speed of the body 110 relative to the horizontal plane. Specifically, the gyro sensing module 176a may sense a rotational angular speed which is parallel to the horizontal plane about the X and Y axes orthogonal to each other. By merging a rotational angular speed (roll) about the X axis and a rotational angular speed (pitch) about the Y axis with the processing module, it is possible to calculate a rotational angular speed relative to the horizontal plane. By integrating the rotational angular speed relative to the horizontal plane, it is possible calculate a tilt value.

The gyro sensing module 176a may sense a predetermined reference direction. The tilt information acquisition unit 180 may acquire the tilt information based on the reference direction.

The azimuth angle sensor (AHRS) 176 may have a gyro sensing function. The azimuth angle sensor 176 may further include an acceleration sensing function. The azimuth angle sensor 176 may further include a magnetic field sensing function.

The azimuth angle sensor 176 may include a gyro sensing module 176a which performs gyro sensing. The gyro sensing module 176a may sense a horizontal rotational speed of the body 110. The gyro sensing module 176a may sense a tilting speed of the body 110 relative to a horizontal plane.

The gyro sensing module 176a may include a gyro sensing function regarding three axes orthogonal to each other in a spatial coordinate system. Information collected by the gyro sensing module 176a may be roll, pitch, and yaw information. The processing module may calculate a direction angle of a cleaner 1 or 1' by integrating the roll, pitch, and yaw angular speeds.

The azimuth angle sensor 176 may include an acceleration sensing module 176b which senses acceleration. The acceleration sensing module 176b has an acceleration sensing function regarding three axes orthogonal to each other in a spatial coordinate system. A predetermined processing module calculates a speed by integrating the acceleration, and may calculate a movement distance by integrating the speed.

The azimuth angle sensor 176 may include a magnetic field sensing module 176c which performs magnetic field sensing. The magnetic sensing module 176c may have a magnetic field sensing function regarding three axes orthogonal to each other in a spatial coordinate system. The magnetic field sensing module 176c may sense the magnetic field of the Earth.

The border signal detector 177 detects the border signal of the wire outside the moving robot 100. The border signal detector 177 may be disposed at the front of the body 110. In doing so, while the moving robot 100 moves in a forward direction which is the primary travel direction, it is possible to sense the border of the travel area in advance. The border signal detector 177 may be disposed in an inner space of the bumper 112b.

The border signal detector 177 may include a first border signal detector 177a and a second border signal detector 177b which are arranged leftward and rightward from each other. The first border signal detector 177a and the second border signal detector 177b may be disposed at the front of the body 110.

When the border signal is a magnetic field signal, the border signal detector 177 includes a magnetic field sensor. The border signal detector 177 may be implemented using a coil to detect a change in a magnetic field. The border signal detector 177 may sense at least a magnetic field of an upward-downward direction. The border signal detector 177 may sense a magnetic field on three axes which are spatially orthogonal to each other.

The GPS detector 178 may be provided to detect a GPS signal. The GPS detector 178 may be implemented using a Printed Circuit Board (PCB).

The cliff detector 179 detects presence of a cliff in a travel surface. The cliff detector 179 may be disposed at the front of the body 110 to detect presence of a cliff in the front of the moving robot 100.

The sensing unit 170 may include an opening/closing detector (not shown) which detects opening/closing of at least one of the first opening and closing door 117 or the second opening and closing door 118. The opening/closing detector may be disposed at the case 112.

The moving robot 100 includes the controller 190 which controls autonomous traveling. The controller 190 may process a signal from the sensing unit 170. The controller 190 may process a signal from the input unit 164.

The controller 190 may control the first driving motor 123(L) and the second driving motor 123(R). The controller 190 may control driving of the blade motor 132. The controller 190 may control outputting of the output unit 165.

The controller 190 includes a main board (not shown) which is disposed in the inner space of the body 110. The main board means a PCB.

The controller 190 may control autonomous traveling of the moving robot 100. The controller 190 may control driving of the traveling unit 120 based on a signal received from the input unit 164. The controller 190 may control driving of the traveling unit 120 based on a signal received from the sensing unit 170.

Previously, an example of setting the border of the traveling area of the moving robot 100 using a wire has been described, but the present invention is not limited thereto, and various wireless methods may be used. For example, the moving robot 100 may determine the current location and the traveling area based on the location information received from the traveling area or a location information transmitter installed around it, a GPS signal using a GPS satellite, or location information received from other terminals. The location information signal may be a GPS signal, an ultrasonic signal, an infrared signal, an electromagnetic signal, or a UWB (Ultra Wide Band) signal.

The moving robot 100 collects location information in order to set the traveling area and the border. The moving robot 100 collects location information by setting a point in an area as a reference location. The moving robot 100 may set any one of an initial starting point, a location of a charging station, and a location information transmitter as a reference location. The moving robot 100 may set a reference position, generate coordinates and a map for an area based on the reference position, and store it in the storage 166. When a map for a traveling area is generated, the moving robot 100 may move based on the stored map. The map for the traveling area may be an environment map including information such as borders and obstacles for the traveling area.

The map for the traveling area stored in the storage 166 is data in which predetermined information of the traveling area is stored in a predetermined format, at least one of a navigation map used for traveling, and a SLAM (Simultaneous localization and mapping) map used for location recognition, an obstacle recognition map in which information on the recognized obstacle is recorded, or a combination of one or more maps may be used.

In addition, a map of the traveling area stored in the storage 166 may be expressed in various forms, such as a grid map and a topology map. For example, the grid map may be a map in which the surrounding space is represented by cells or grids (hereinafter, referred to as grids) of the same size and the presence or absence of objects in each grid. For example, a white grid may represent an area without an object, and a black grid may represent an area with the object. Therefore, the line connecting the black grid may represent a border line (wall, obstacle, etc.) of a certain space. Depending on the embodiment, a predicted risk area may be set for stable traveling. For example, the predicted risk area may be one or more grids adjacent to a border line (wall, obstacle, etc.). Meanwhile, the predicted risk area may be represented by a gray grid. The color of the grid may be changed through image processing.

The size of the grid may be set differently. For example, if both the length and width of the moving robot 100 are 50 cm, the length and width of the grid may be set to 25 cm. In this case, the moving robot 100 may be positioned when the 2 by 2 grid is an area of an empty space. The length and width of the grid may be set to 10 cm. In this case, the moving robot 100 may be positioned when the 5 by 5 grid is an area of an empty space. Alternatively, the size of the grid may be set based on the operation unit 130 such as the blade 131 of the moving robot 100.

According to an embodiment, a cost representing predetermined information may be assigned to each grid. For example, a relatively high cost is given to a grid corresponding to the border line, and the controller 190 may control travelling based on the cost. The moving robot 100 according to an embodiment of the present invention may use a gradient method-based route planning using the concept of travelling cost to generate an optimal route from a starting point to a target point.

Hereinafter, controlling travel of the moving robot 100 will be described in detail with reference to FIGS. 8 to 19*c*.

Figure 8:
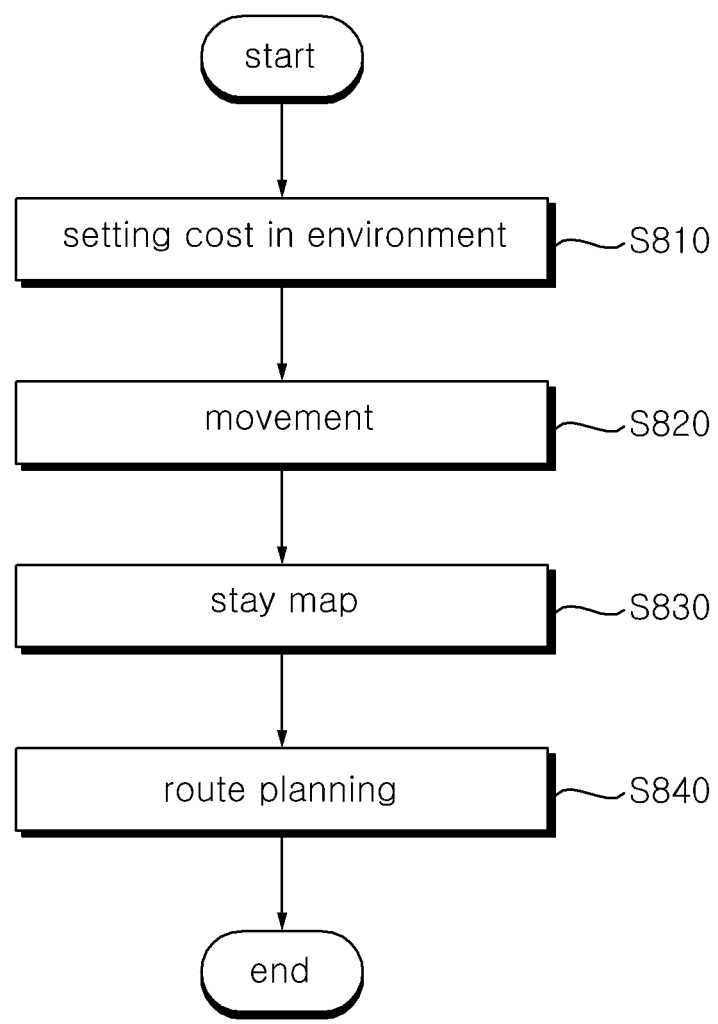
FIG. 8 is a flowchart of a method for controlling a moving robot according to an embodiment of the present invention.

FIG. 8 is a flowchart of a method for controlling a moving robot according to an embodiment of the present invention, and FIGS. 9 to 19*c* are views referenced for description of a method for controlling a moving robot according to an embodiment of the present invention.

The moving robot 100 according to an aspect of the present invention may minimize lawn damage and improve efficiency by minimizing visits to the same point. To this end, the controller 190 according to an aspect of the present invention may minimize visits to the same point by reflecting the cost of a route that has passed during travelling in a later route plan.

Referring to FIG. 8, the controller 190 may assign a cost to an environment of the travelling area. For example, the controller 190 may set cost information on grids of a grid map corresponding to the travelling area based on environment information of the travelling area (S810).

Figure 9:
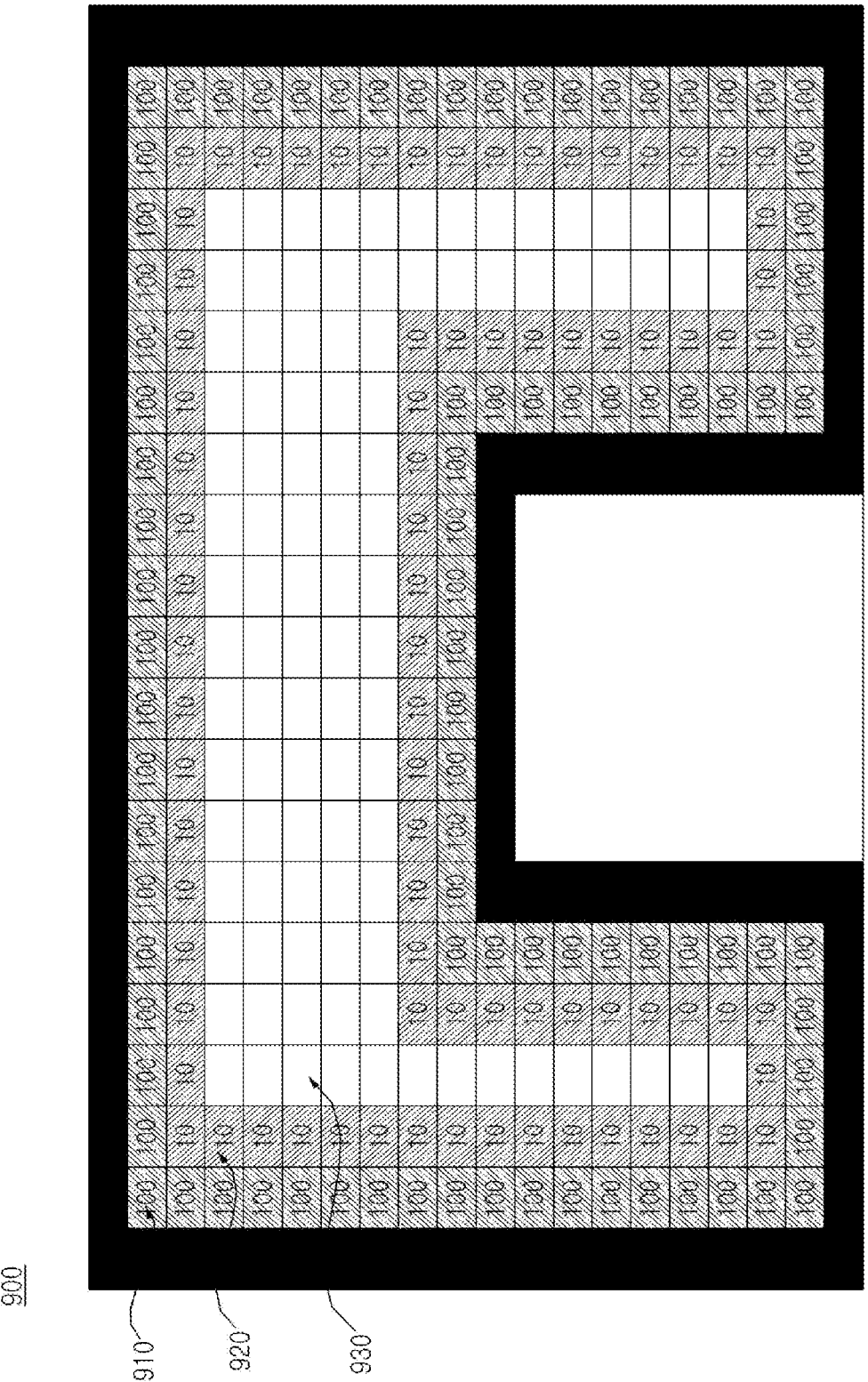

FIG. 9 illustrates a grid map 900, a black grid indicates a border line (wall, obstacle, etc.) of a travelling area, and a white grid indicates the travelling area in which the moving robot 100 may travel.

In addition, costs based on environmental information, such as whether an obstacle exists, the type of the obstacle, the size of the obstacle, and whether the obstacle is adjacent, may be assigned to the grids of the grid map 900.

In addition, a cost value may be set based on environmental information such as whether an obstacle exists, the type of the obstacle, the size of the obstacle, and whether the obstacle is adjacent.

For example, a first value may be set for a risk area 910 corresponding to a fixed object or a border line, and a second value lower than the first value may be set for a predicted risk area 920 adjacent to the risk area 910. Depending on the embodiment, the cost given to the grid included in the risk area 910 may be set differently according to the type of obstacle and the size of the obstacle, and the cost given to the grid included in the predicted risk area 920 may also be set differently according to the type, size, and distance of adjacent obstacles.

The cost may be set to zero in the grid of a general area 930 without obstacles. Alternatively, a relatively low cost may be set on the grid of the general area 930 without obstacles based on the distance to the obstacle.

The cost information of each grid may mean a possibility that the moving robot 100 avoids or collides with an obstacle, or a possibility of moving adjacent to an obstacle when the corresponding grid is moved. In the grid 930 where the cost is zero or the cost is low, the moving robot 100 may be far away from an obstacle such as a fixed object or a moving object.

Meanwhile, the grid may be displayed in a different display state according to environmental information and cost of the grid in the grid map 900. For example, the color and chroma of the risk area 910, the risk prediction area 920, and the general area 930 may be displayed differently.

Accordingly, the cost of the grid map 900 may be intuitively displayed in the form of a contour line.

The moving robot 100 according to an embodiment of the present invention may use a gradient method-based route planning using the concept of travelling cost to generate an optimal route from a starting point to a target point, and the cost set based on the environmental information may be an intrinsic cost.

The intrinsic cost is a cost representing the characteristics of an area set in relation to the environment, and may be given to an area that obstructs travelling, such as a fixed obstacle. Intrinsic cost may be given according to the presence or absence of an obstacle, and may be given in proportion to the distance between each grid and the obstacle, and the travelling risk of the corresponding grid space.

In the example of FIG. 9, the intrinsic cost is set to '100' for the grids of the risk area 910 corresponding to the fixed obstacle, and is set to '10' lower than '100' for the grids of the predicted risk area 920 adjacent to the risk area 910.

A relatively high cost is set for the fixed obstacle so that the moving robot 100 does not collide with the fixed obstacle, and a certain amount of cost is set for the adjacent area of the fixed obstacle so as not to approach the fixed obstacle as much as possible.

Meanwhile, the gradient method-based route planning may calculate the minimum cost including adjacent cost and establish a route.

Adjacent cost is a route cost related to movement between two points, and is a virtual cost to create a route from a starting point to an arrival point. In most cases, the cost of the adjacent cost will be proportional to the distance traveled.

Figure 10:
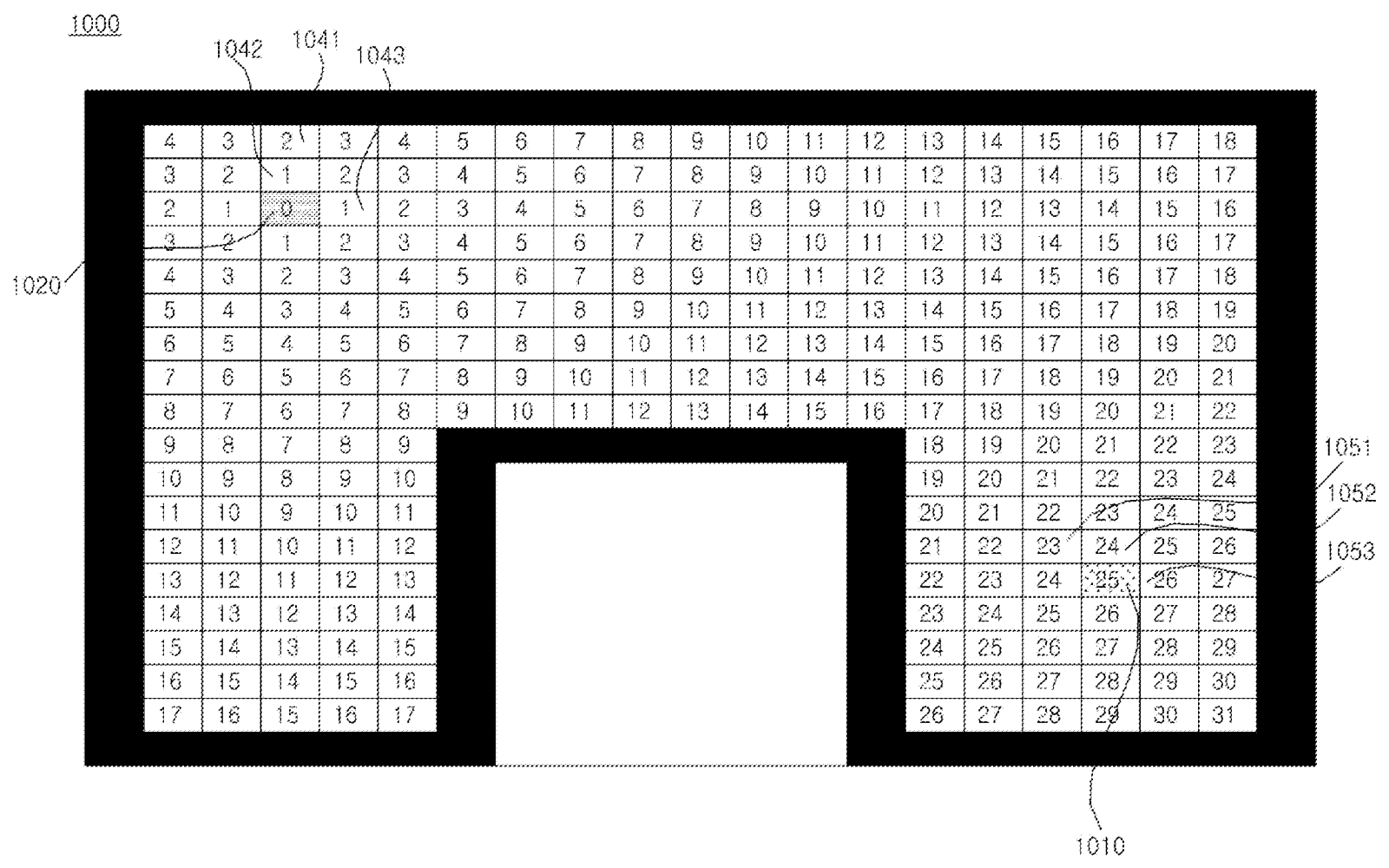

The adjacent cost from the starting point 1010 to the arrival point 1020 is shown on the grid map 1000 of FIG. 10.

Adjacent cost is the cost of the distance incurred to travel from one starting point 1010 grid to the arrival point 1020 grid. In the example of FIG. 10, '1' is set as the inter-grid movement cost. For example, the adjacent cost from the grids 1042 and 1043 adjacent to the arrival point 1020 to the arrival point 1020 is '1'. In addition, the adjacent cost of the grid 1041 adjacent to the grid 1042 adjacent to the arrival point 1020, that is, the grid 1041 separated by one grid from the arrival point 1020, is '2'. In the same way, the adjacent cost of the starting point 1010 and the grids 1051, 1052, 1053 near the starting point 1010 may be determined.

Meanwhile, a value other than '1' illustrated in FIG. 10 may be set for the inter-grid movement cost. In addition, the arrival point 1020 is set to '0' and the adjacent cost increases by '1' per grid in FIG. 10, but the starting point 1010 may be set to '0' and the adjacent cost increases by '1' per grid.

Meanwhile, the cost set based on the environmental information of the travelling area may be a sum of the adjacent cost and the intrinsic cost. When establishing a route plan for the movement of the moving robot 100 from the starting point 1010 to the arrival point 1020, the controller 190 may establish the route of the least cost by comparing the sum of the adjacent cost and intrinsic cost from the starting point 1010 to the arrival point 1020 for each expected route.

Figure 11:
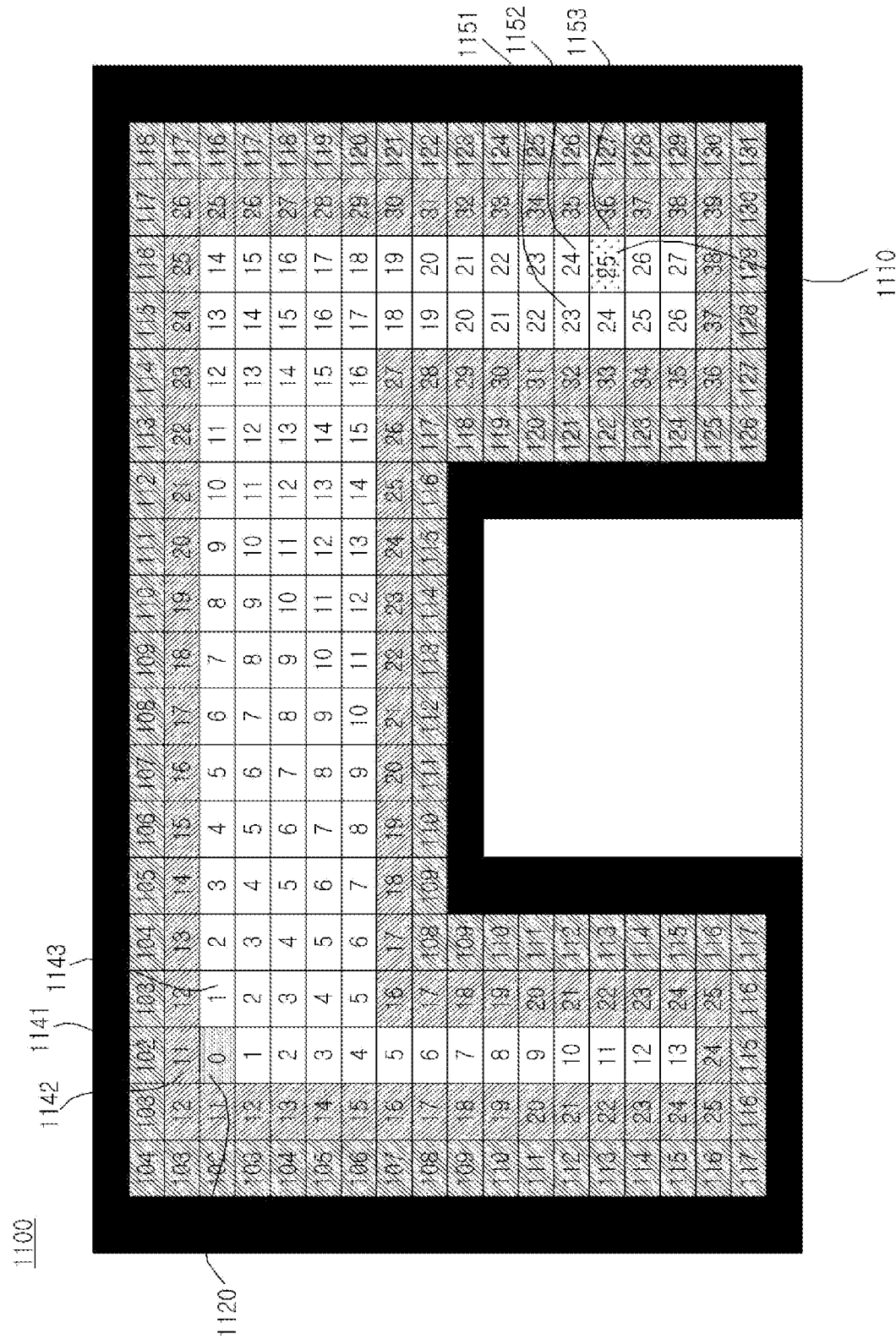

FIG. 11 is an illustration of a grid map 1100 including an environmental cost in which the intrinsic cost of FIG. 9 and the adjacent cost of FIG. 10 are summed, and the starting point 1110 and the arrival point 1120 of FIG. 11 is the same as the starting point 1010 and the arrival point 1020.

Referring to FIGS. 9 to 11, it may be seen that the environmental cost assigned to the grids 1141, 1142, 1143, 1151, 1152, and 1153 in FIG. 11 is the sum of the adjacent cost assigned to the grids 1041, 1042, 1043, 1051, 1052, 1053) in FIG. 10 and the intrinsic cost illustrated in FIG. 9.

Figure 12:
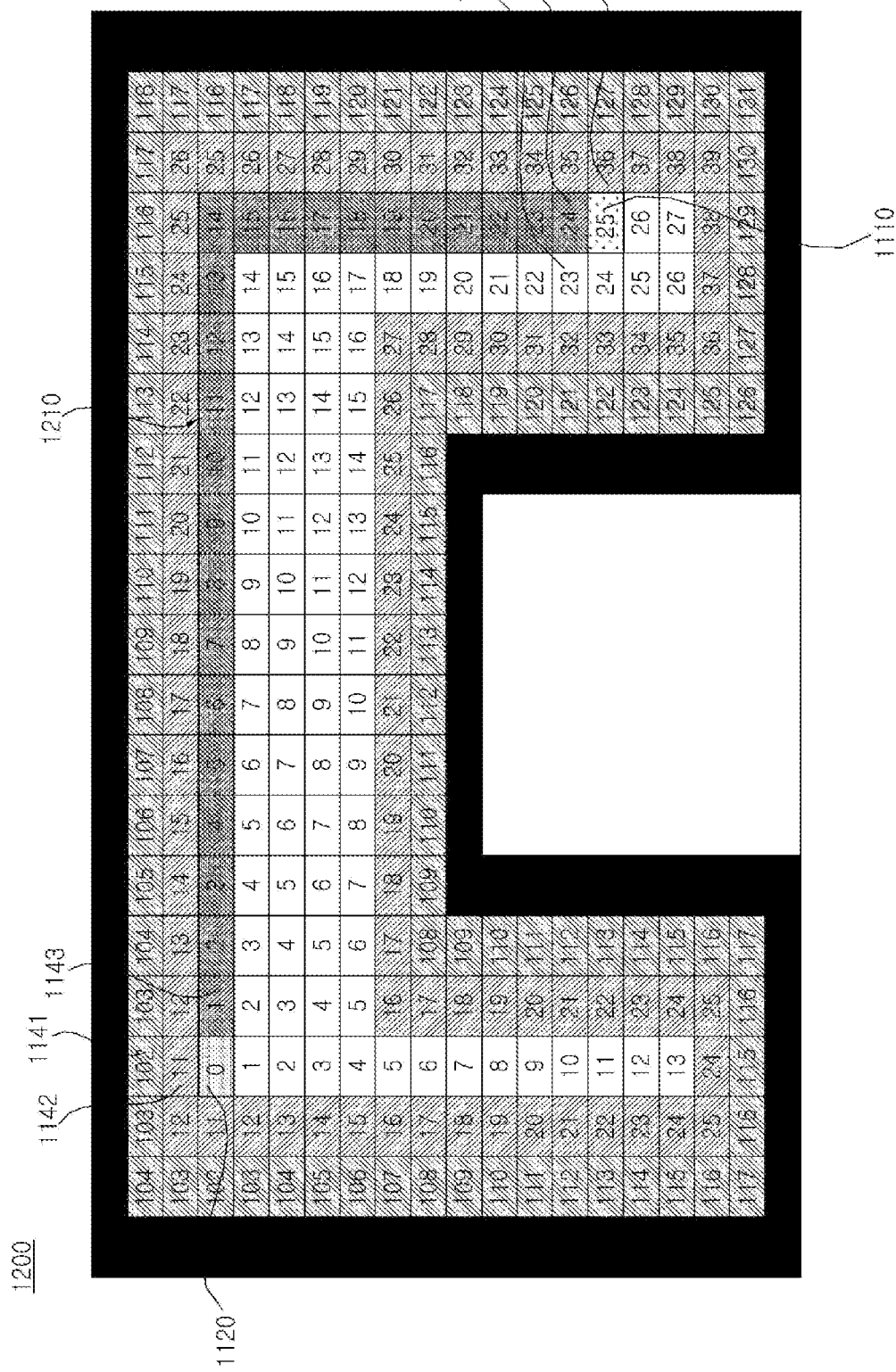

FIG. 12 illustrates a grid map 1200 in which a route 1210 of a minimum cost established based on a gradient method is displayed.

Referring to FIG. 12, the controller 190 may establish a route 1210 of minimum cost from a starting point 1110 to an arrival point 1120 based on the environmental cost of the grids.

The moving robot 100 may travel based on cost information (S820). The controller 190 may control the travelling unit 120 to move according to the minimum cost route 1210 (S820).

Meanwhile, the controller 190 may calculate a minimum cost as an environmental cost, establish a route plan, and control the traveling of the moving robot 100. At this time, if the starting point and arrival point are the same, they will always drive the same route. Since intrinsic cost is given to fixed obstacles, there is almost no change, and adjacent costs are the same as long as they move between the same points. Therefore, if the starting point and arrival point are the same, there is only one route 1210 of least cost, and it continues to travel in the only least cost route 1210 Accordingly, the area of the least cost route 1210 has a greater possibility of lawn damage compared to areas corresponding to other grids.

According to an embodiment of the present invention, a cost is given even when mowing a lawn or moving a corresponding area, so that a previously passed moving route is considered in the route plan when establishing a route plan, thereby minimizing revisiting the same area.

Meanwhile, various maps such as the grid map 900 and map-related data may be stored in the storage 166. Accordingly, the grid map 900 and cost information of grids included in the grid map 900 may be stored in the storage 166.

The cost given to the passing route may be referred to as a stay cost, and the controller 190 may increase the stay cost of the grid corresponding to the route passed during travelling and store it in the storage 166(S830).

The stay cost may be separately stored in a stay map composed of grids corresponding to the travelling area and stay costs of each grid. When establishing a route plan, the controller 190 may call stay costs of the stay map and add them to other environmental costs.

Alternatively, the intrinsic cost and the stay cost may be stored on the grid map. In addition, when the starting point and the arrival point are determined and the adjacent cost is calculated, the intrinsic cost and the stay cost are summed with the adjacent cost, and the total cost may be stored in association with the grid map.

The stay cost is accumulated from the initial environment map generation, and if the travelling to which the initial stay cost is assigned is the first travelling, the controller 190 may plan a route based on the stay cost accumulated from the first travelling when planning the route from the next second travelling (S840). Accordingly, revisiting the same area may be minimized without additional hardware such as wires.

Figure 13:
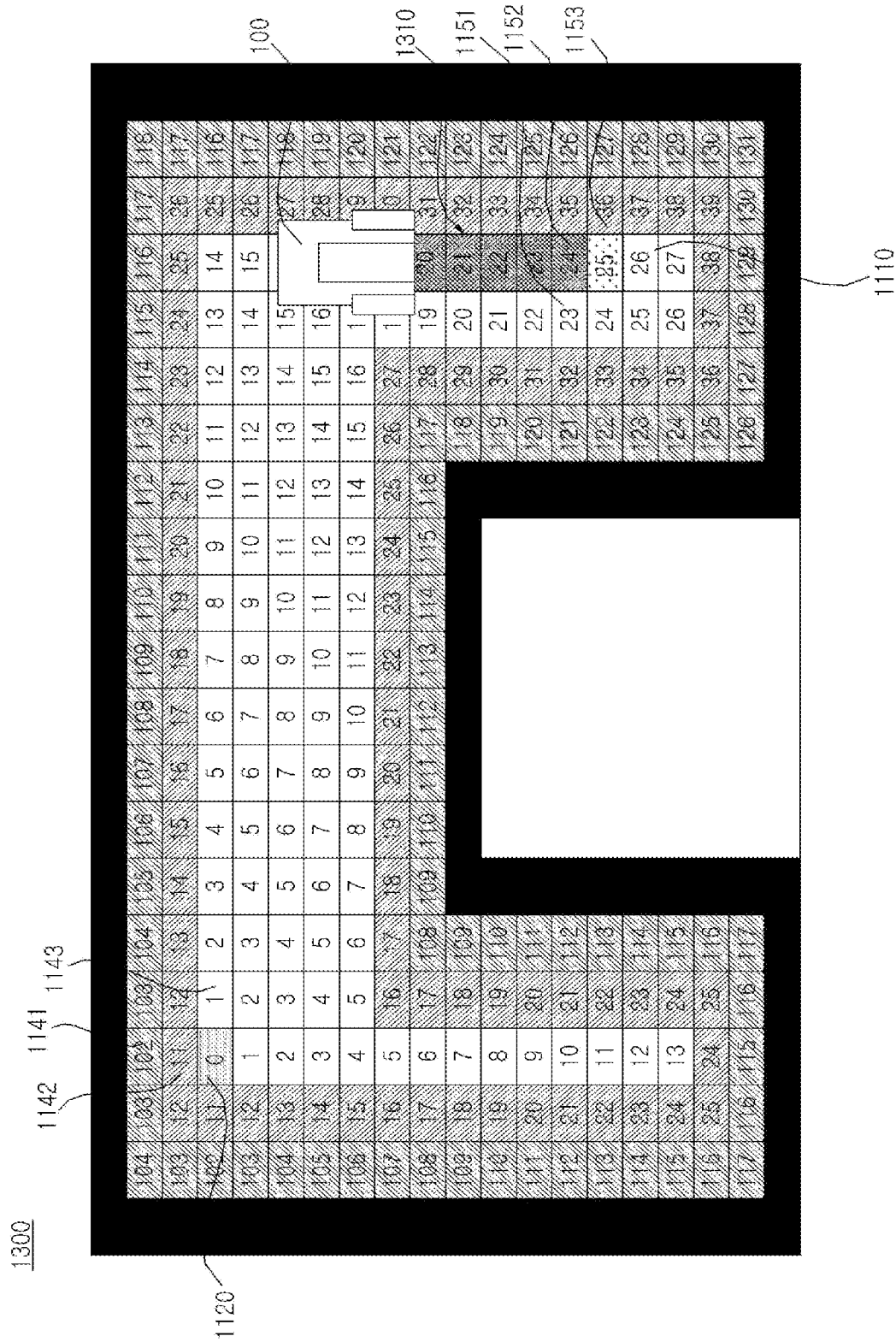

FIG. 13 illustrates a process in which the cost of the grid map 1300 is changed according to the movement of the moving robot 100.

Referring to FIG. 13, the cost assigned to the route 1310 that has passed increases by a set increase amount as the moving robot 100 moves. The amount of increase is a cost that increases each time the moving robot 100 passes.

When the moving robot 100 passes once, the increase in the stay cost may be determined based on the adjacent cost.

For example, the controller 190 may increase the stay cost equal to a difference value of adjacent costs between two adjacent grids during one travelling. That is, when passing once, the increase in stay cost may be equal to the increase in adjacent cost per grid. Accordingly, the cost related to 'movement' of the moving robot 100 may be equally managed.

FIG. 13 illustrates an example in which the increase amount of stay cost is set to '1' during one travelling, which is the same as the increase amount of adjacent cost '1'.

Figure 14:
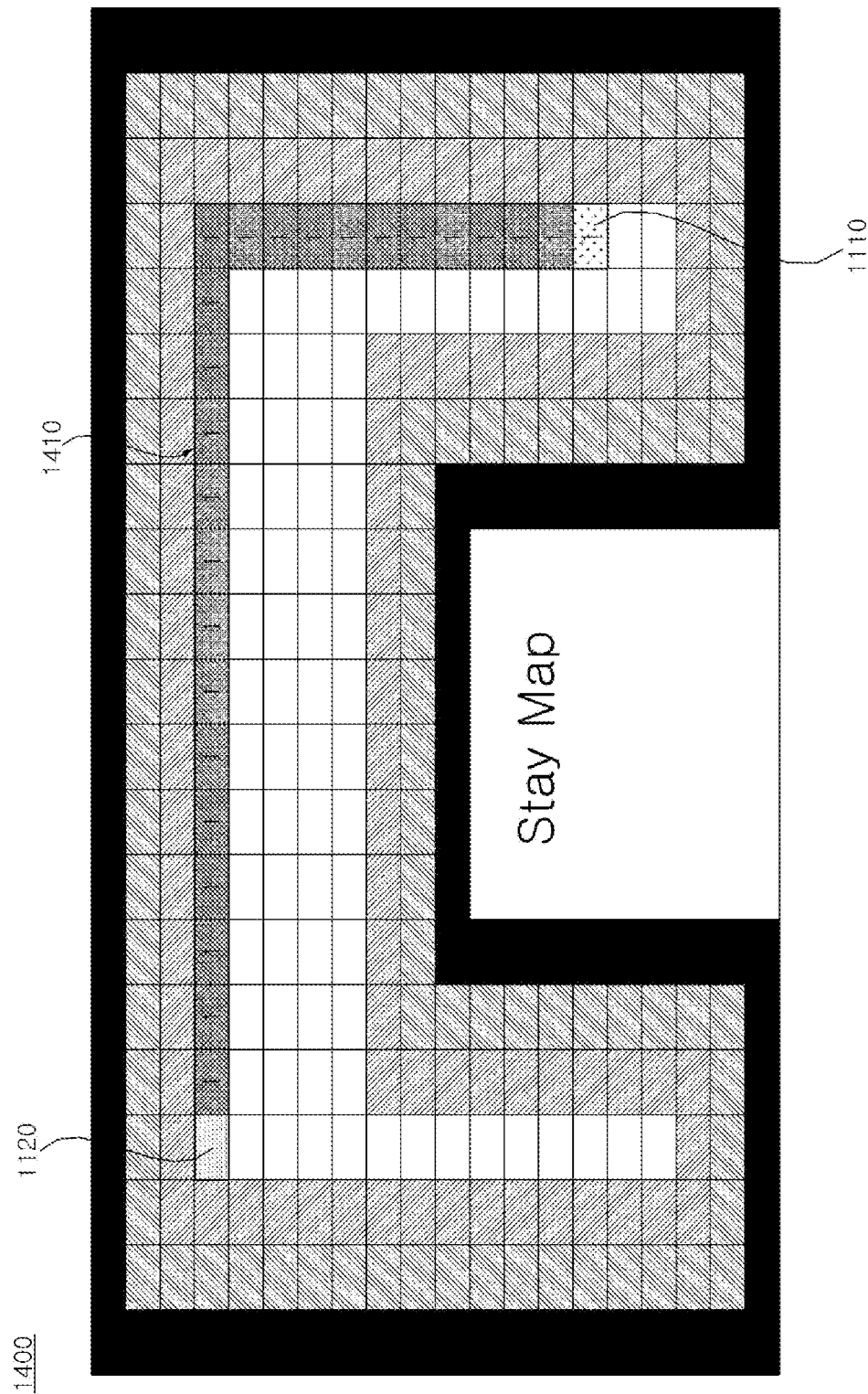
Figure 15:
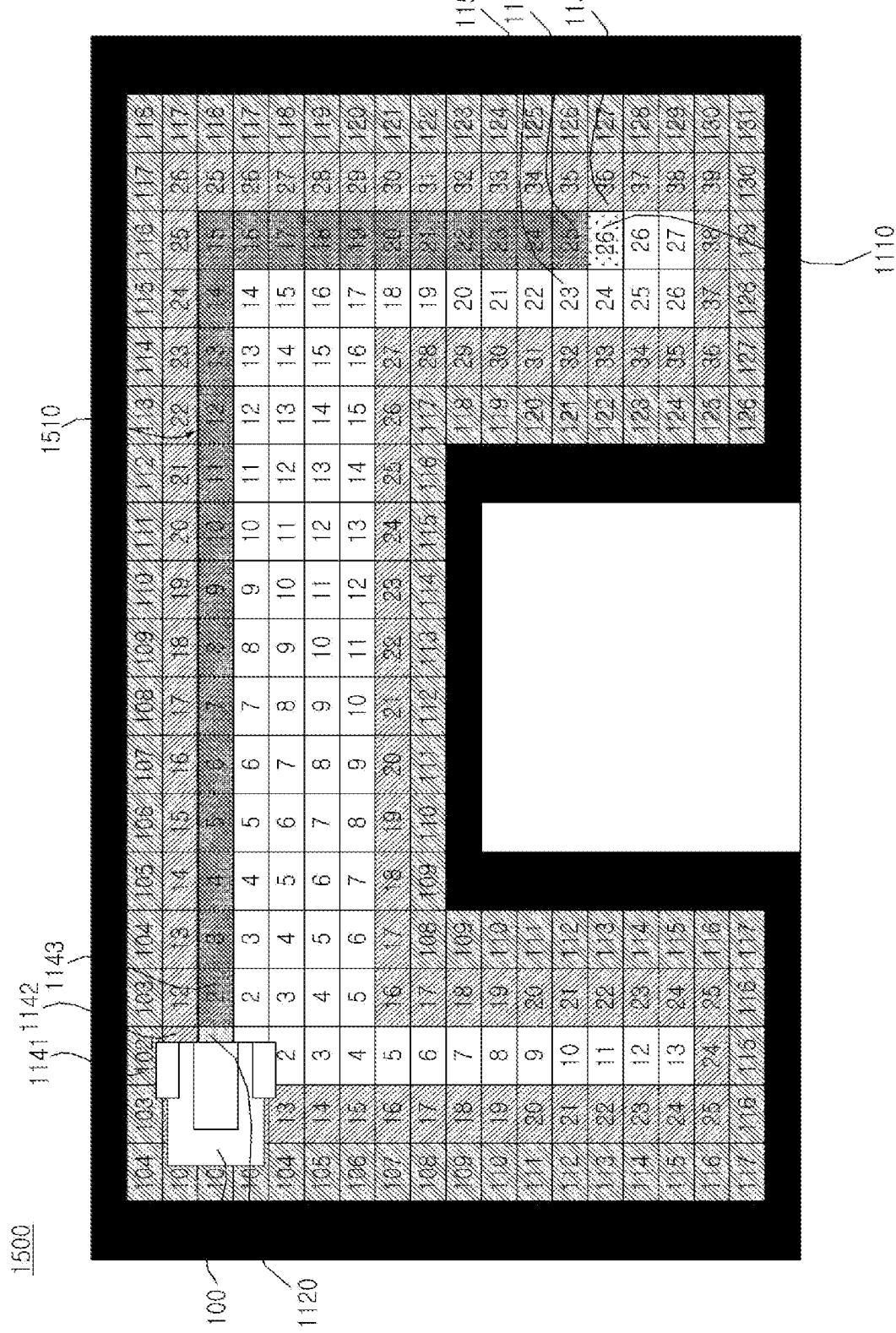

FIG. 14 illustrates a stay map 1400 generated after the movement of the moving robot 100 is finished, and FIG. 15 illustrates a grid map 1500 in which the total travelling cost changed after the movement of the moving robot 100 is finished is reflected.

Referring to FIG. 14, the stay cost is given to the grids of the route 1410 on which the moving robot 100 has moved among the grids included in the stay map 140 by '1'.

Referring to FIG. 15, it may be seen that the total cost of the grids of the route 1510 in which the moving robot 100 has moved increases by '1' as the stay cost increases by '1'.

Alternatively, the controller 190 may significantly increase the stay cost from the difference value of the adjacent cost of two adjacent grids during one travelling. That is, the increase in the stay cost once passed may be greater than the increase in the adjacent cost per grid. Accordingly, the cost of stay may be more reflected in the route planning.

According to an embodiment of the present invention, the controller 190 may generate a movement route based on cost information, control the travelling unit 120 to travel according to the generated movement route (S820), increase the stay cost of the grid corresponding to the passed route during the travelling and control the storage 166 to store the increased stay cost (S830).

In addition, the controller 190 may reflect the stay cost stored in the storage 166 in subsequent route planning establishment (S840 and S810).

The controller 190 may determine the minimum cost route based on cost information including the intrinsic cost and the stay cost.

In addition, the controller 190 may calculate a travelling cost by summing the intrinsic cost, the stay cost, and the adjacent cost for a distance that occurs when moving from the starting point to the arrival point, and generate the travel route as a route with the minimum travelling cost.

Figure 16:
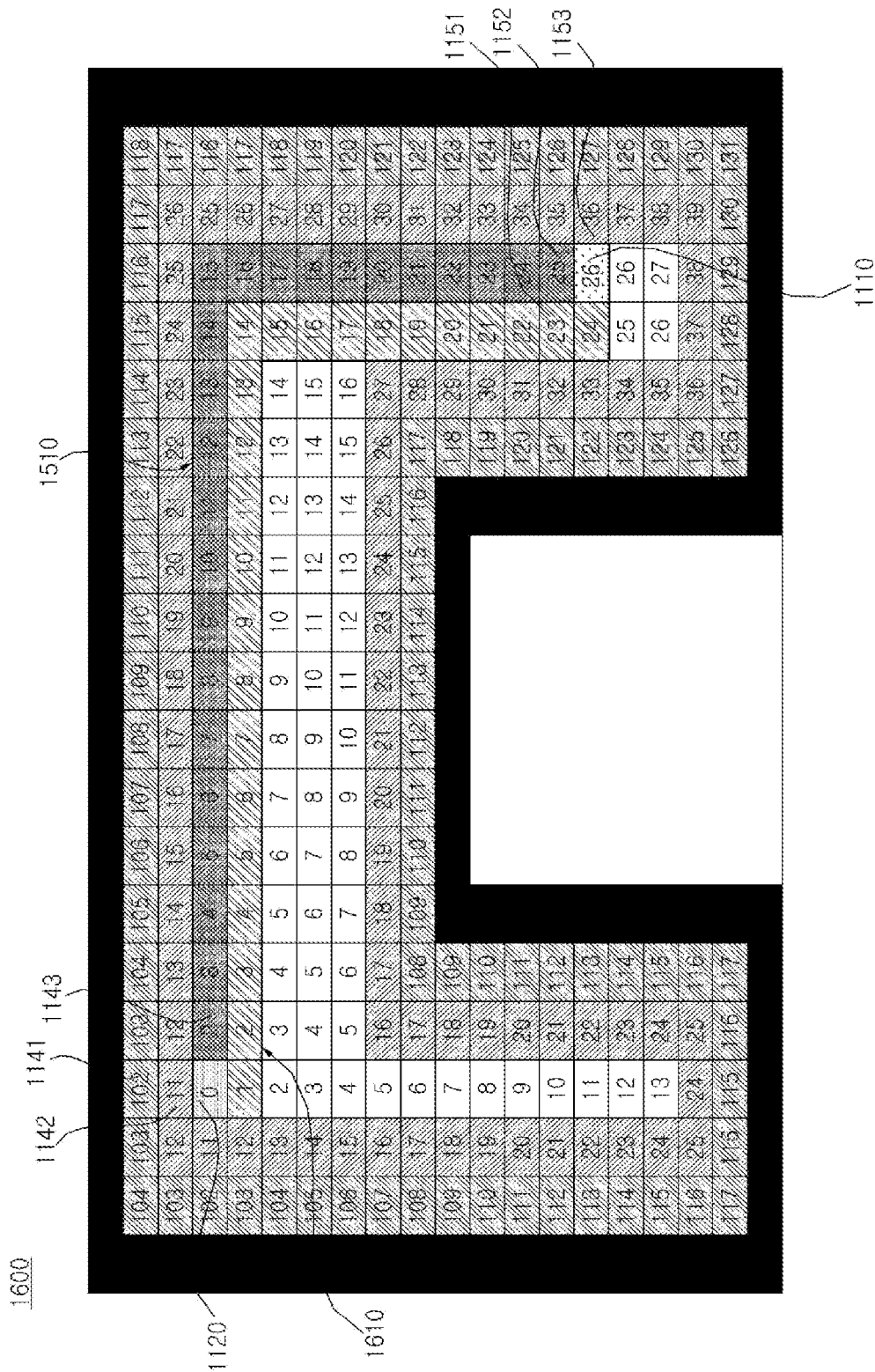

FIG. 16 illustrates a process of establishing a route plan reflecting the stay cost from the same starting point 1110 to the arrival point 1120 in the travelling cost state illustrated in FIG. 15.

Referring to FIG. 16, the total travelling cost in which the intrinsic cost, the adjacent cost, and the stay cost reflecting the travelling up to the previous round are added on the grid map 1600 is illustrated.

The controller 190 may generate the minimum cost route 1610 by using the total travelling cost including the stay cost. Accordingly, a route 1610 different from the route 1510 of the previous round is generated, and the route 1510 of the previous round may not be visited repeatedly.

According to an embodiment, if there are a plurality of minimum cost paths, priority may be given to stay cost, and a route with low stay cost may be selected.

Meanwhile, after the moving robot 100 travels the second time along the route 1610 selected in FIG. 16, the increase in stay cost according to the result of the second travel may be reflected in the stay map.

Figure 17:
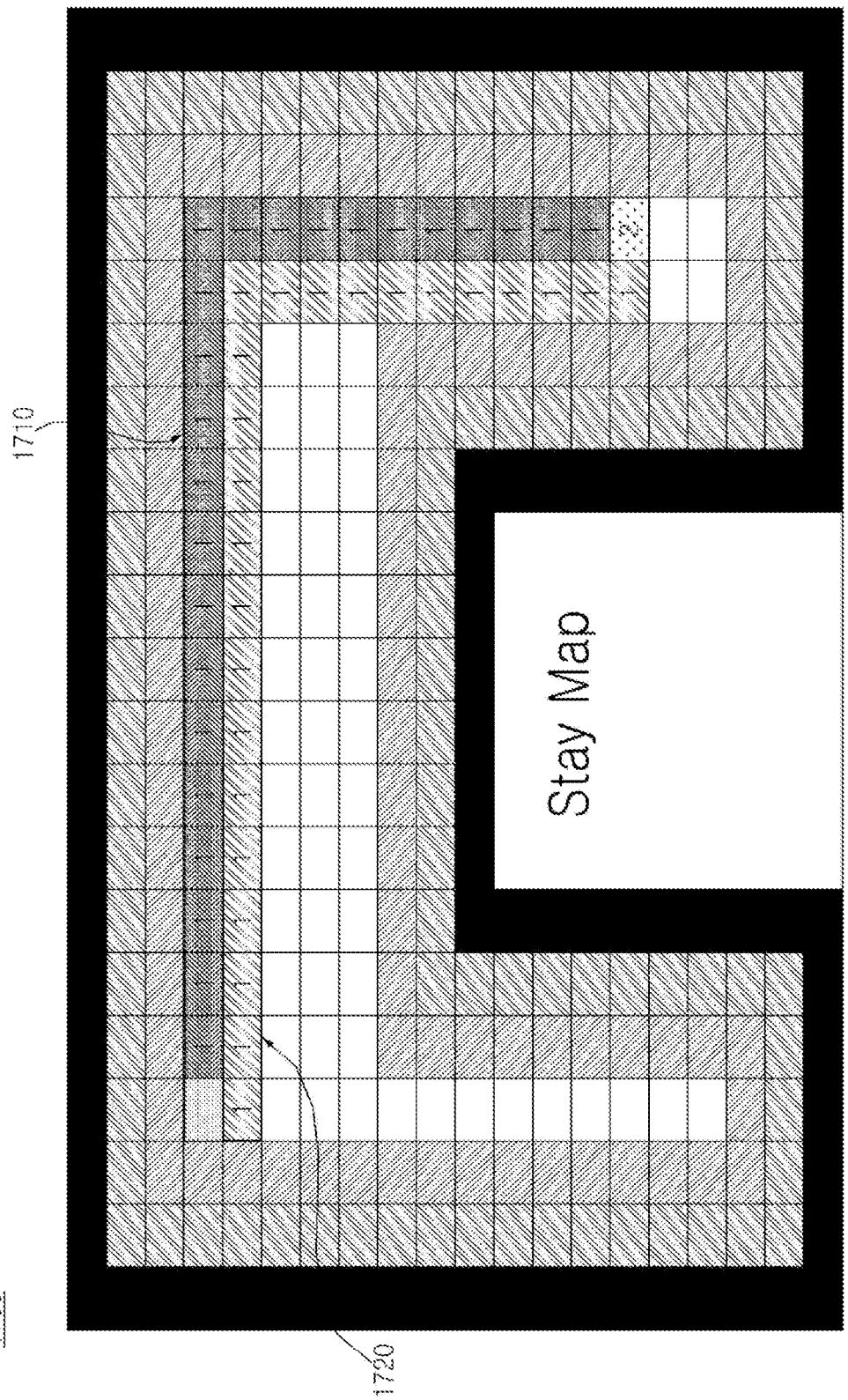

FIG. 17 illustrates a stay map 1700 including a stay cost according to the first and second travellings.

Referring to FIG. 17, the stay map 1700 may reflect the stay cost 1710 according to the first travelling and the stay cost 1720 according to the second travelling. In this way, the stay cost according to the traveling of the moving robot 100 may be accumulated and updated in the stay map 1700.

According to an embodiment of the present invention, the stay cost is accumulated. If the cumulative value of the stay cost is too large, it may be greater than the cost set for risk avoidance, and there may be situations in which the moving robot enter or come close to the risk area. Accordingly, the controller 190 may reset the stay cost according to a certain condition.

The controller 190 may initialize all stay costs when the stay cost of any one grid becomes more than the minimum value of the intrinsic cost.

In some cases, a first value may be set for the risk area 910 corresponding to the fixed object or the border line, and a second value lower than the first value may be set for the predicted risk area 920 adjacent to the risk area 910. In this case, the controller 190 may initialize all stay costs when the stay cost of any one of the grids is equal to or greater than the second value.

According to an exemplary embodiment of the present invention, when the stay cost of one grid is equal to or greater than the intrinsic cost of an adjacent grid, all stay costs may be initialized.

Alternatively, if the predicted risk area 920 may perform a sufficient role as a buffer area, all stay costs may be initialized when the total stay cost exceeds the second value.

Figure 18:
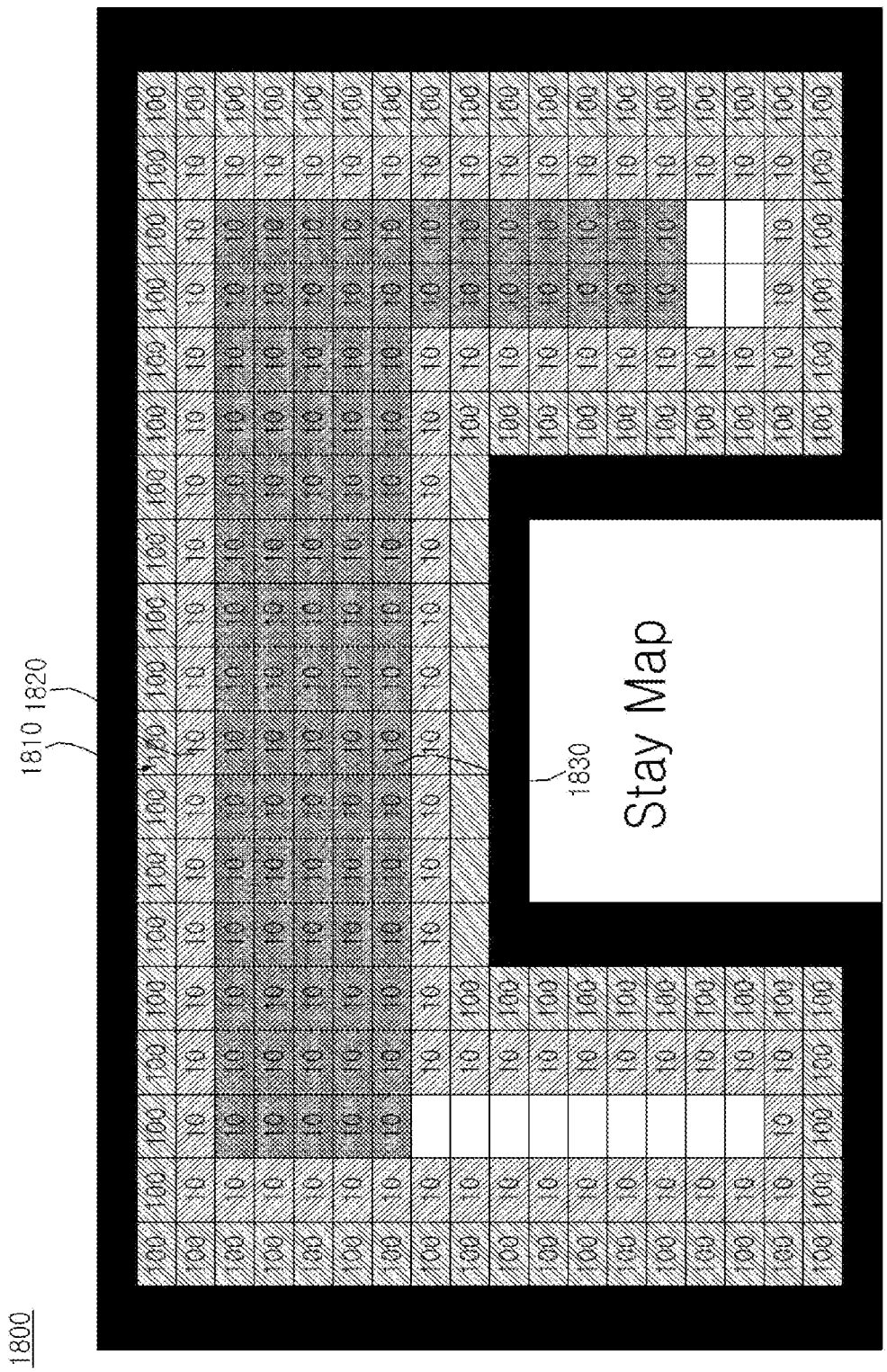

Referring to FIG. 18, a grid map 1800 in which the intrinsic cost and the stay cost are summed is illustrated. In the example of FIG. 18, a first value (eg, '100') is assigned as a cost to the grids of the risk area 1810 corresponding to the fixed obstacle, and a second value (e.g., '10') lower than the first value is assigned as a cost to the grids of the predicted risk area 1820 adjacent to the risk area 1810.

Referring to FIG. 18, when the stay cost of one grid 1830 is equal to or greater than the minimum value (e.g., 10) of the intrinsic cost, all stay costs may be initialized to zero.

Alternatively, when all the stay costs are equal to or greater than the second value (e.g., '10'), all stay costs may be set to be initialized to zero.

According to an embodiment of the present invention, the stay cost reflecting the travelling history of the moving robot 100 may be additionally included in the cost in cost-based route planning.

That is, the stay cost is an additional cost given to the area where the moving robot 100 stayed, and by planning the route including the stay cost when planning the route, it is possible to minimize the movement of the same area in the same area and reduce damage to the lawn.

Figure 19A:
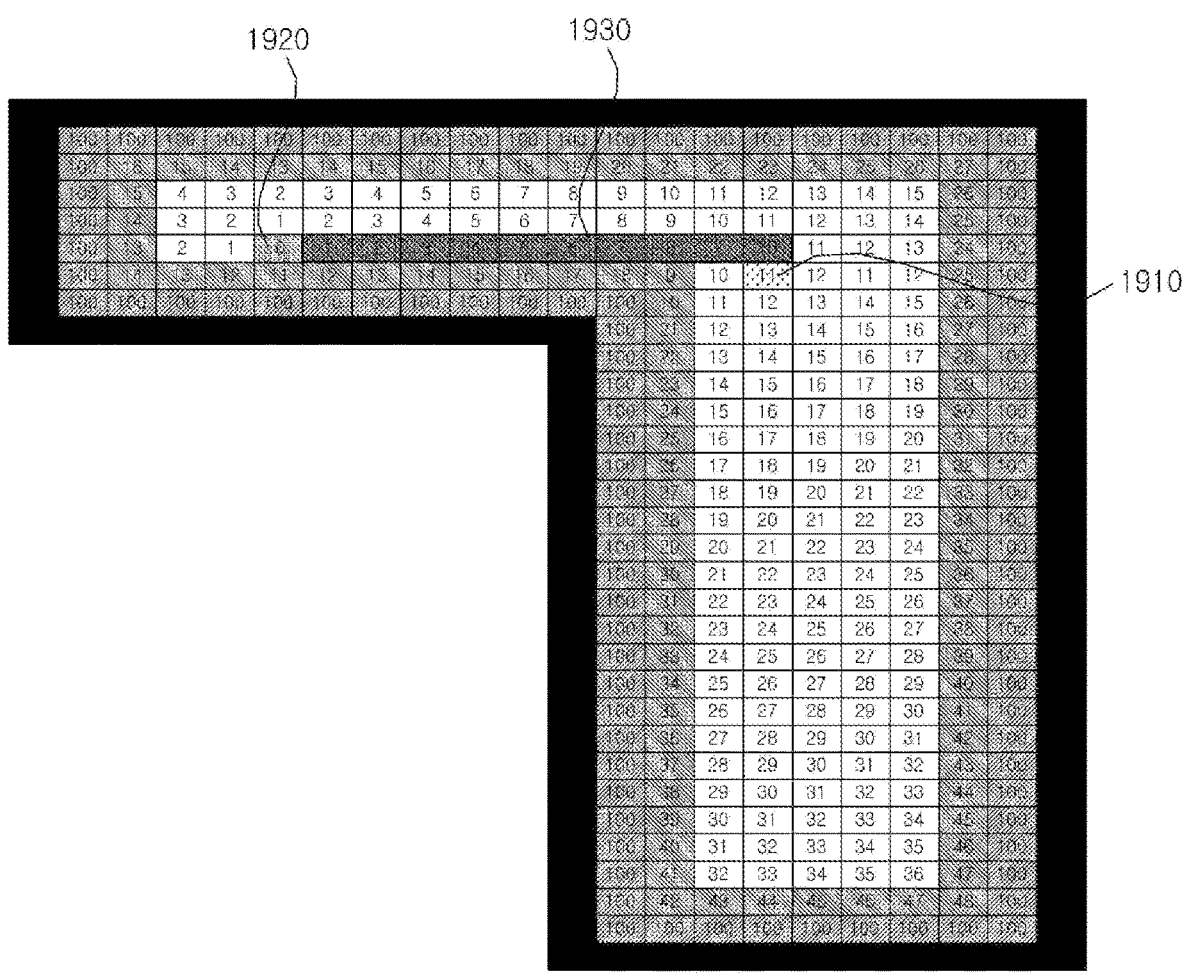
Figure 19B:
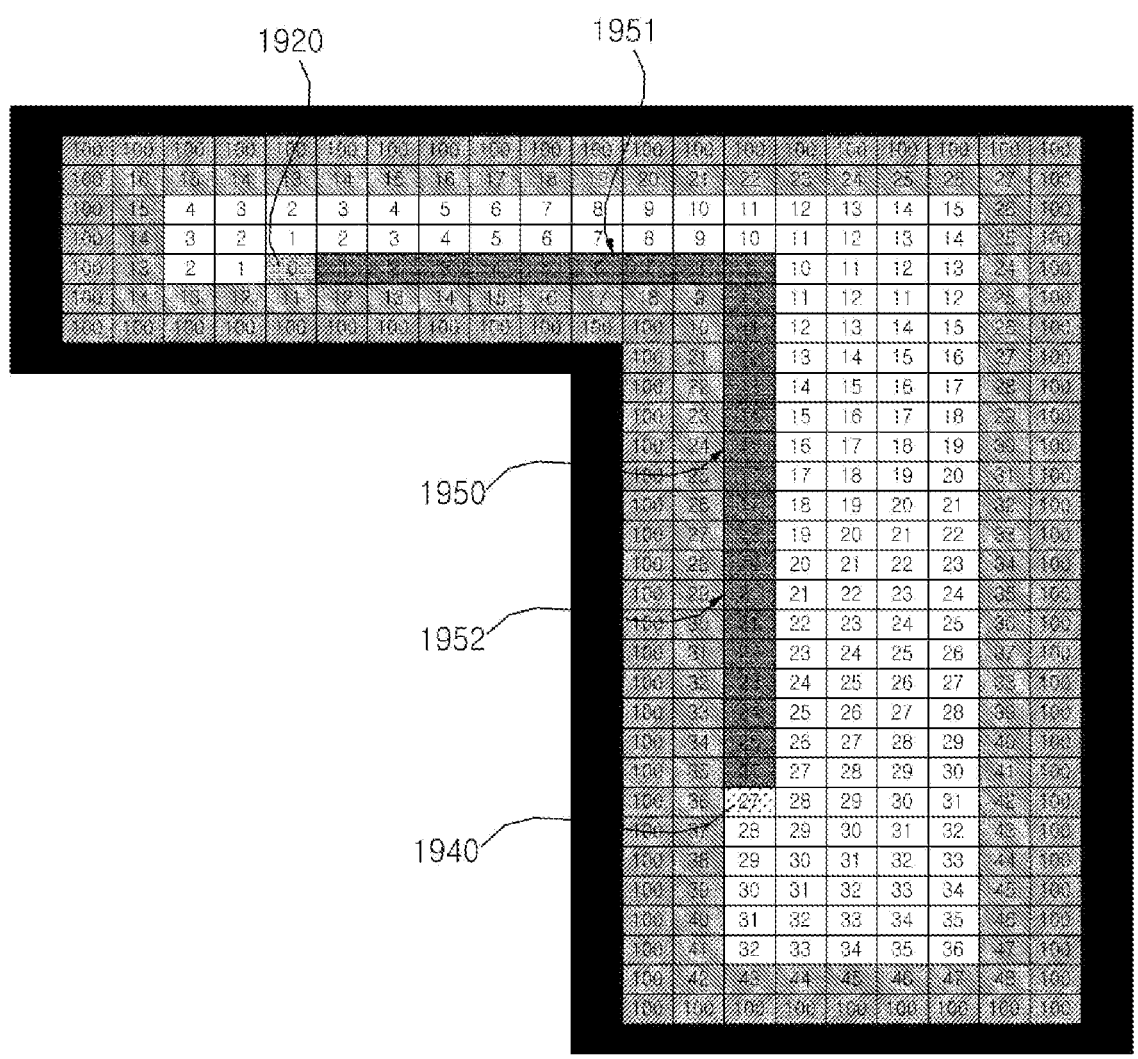
Figure 19C:
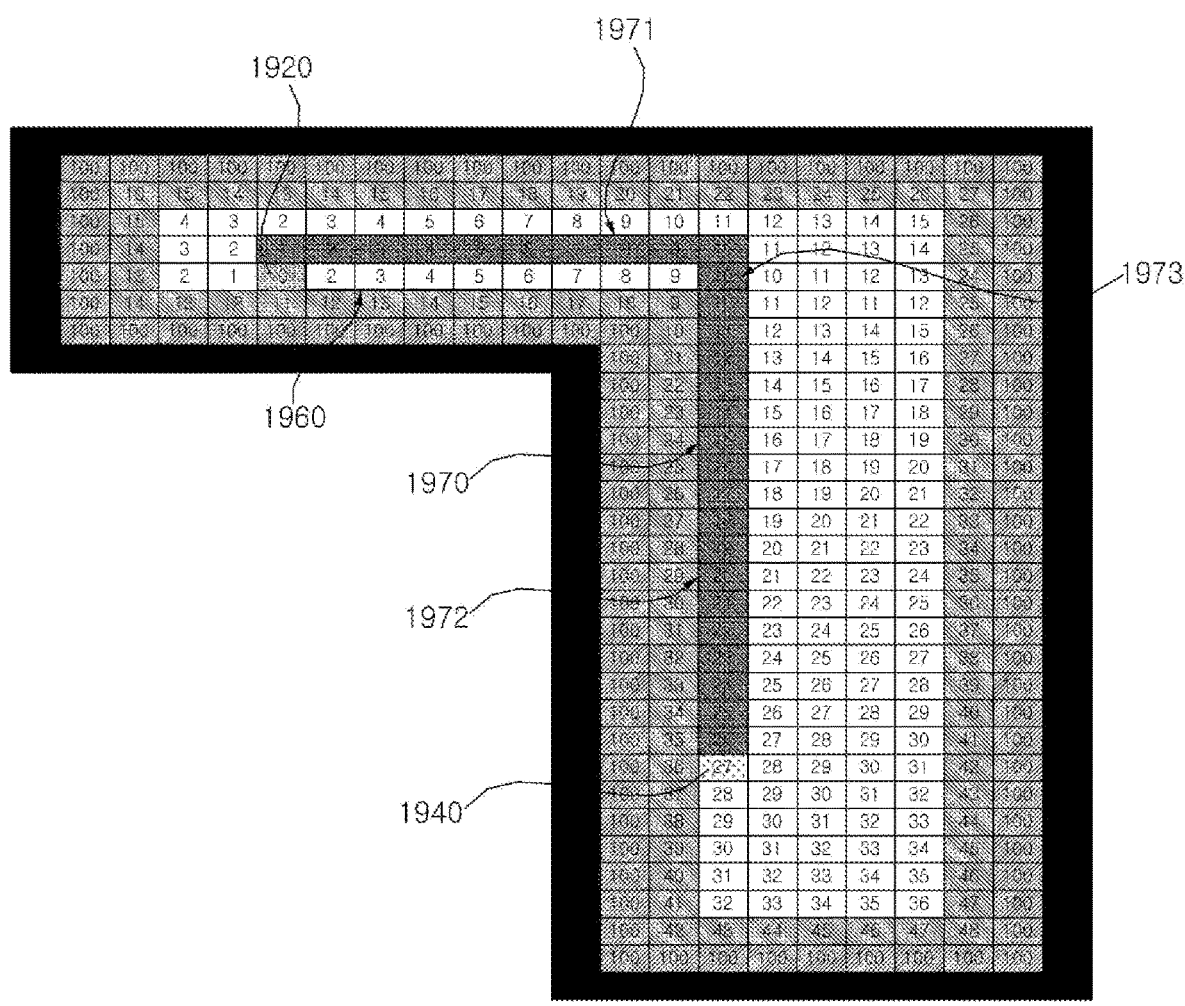

FIGS. 19*a* to 19*c* are diagrams referenced for explanation of shortest route plan that minimizes revisiting.

First the first route 1930 may be selected from the first starting point 1910 to the arrival point 1920 according to the shortest route plan in the overall cost state as shown in FIG. 19*a*, and the moving robot 100 may travel from the first starting point 1910 to the arrival point 1920 along the first route 1930 in the first travelling, and reflect this in the stay cost.

If the second travelling is to move from the second starting point 1940 to the arrival point 1920, the second route 1950 may be selected as shown in FIG. 19*b* according to the shortest distance route plan.

The first and second travelling s differ from the starting point, and there is a difference in some sections 1952 from the second starting point 1940. However, since the arrival point 1920 for the first and second travelling is the same, the first route 1930 and the second route 1950 may include the same section 1951. Therefore, the same section 1951 is visited repeatedly.

According to an embodiment of the present invention, revisiting the same area may be minimized by adding a stay cost reflecting the first travelling to the cost to establish a route.

Referring to FIG. 19*c*, the stay cost is reflected in the grids 1960 and 1973 where the moving robot 100 stayed during the first travelling. Accordingly, when the second travelling is to move from the second starting point 1940 to the arrival point 1920, if a route plan is established at the minimum cost, the third route 1970 may be selected.

Referring to FIGS. 19*a* and 19*c*, the third route 1970 does not overlap with the previous route 1960 in most of the sections 1971 and 1972, and the redundant visit section 1973 may be minimized.

According to an embodiment of the present invention, a route minimizing revisiting may be established based on the location of the moving robot 100 and the location of a destination such as a charging station and a route at the time of previous travelling. And the moving robot traveled based on the route minimizing revisiting. Accordingly, it is possible to effectively establish a route according to the situation.

According to an embodiment of the present invention, it may be applied to both a wire method and a wireless method, and there is an advantage that an additional wire installation is not required.

According to at least one of the embodiments of the present invention, there is an advantage in that damage to the lawn may be minimized and efficiency may be improved by minimizing visits to the same point.

In addition, according to at least one of the embodiments of the present invention, it is possible to provide a moving robot having high efficiency and reliability in an outdoor environment and a control method thereof.

In addition, according to at least one of the embodiments of the present invention, it is possible to provide a moving robot and a control method thereof capable of reducing the possibility of lawn damage and improving efficiency in a wire method and a wireless method by minimizing an area that repeatedly travels independently of a wire.

In addition, according to at least one of the embodiments of the present invention, a route may be effectively established according to the situation.

The moving robot and a method of controlling the moving robot according to the present invention are not limited to the configuration and method of the embodiments described as described above, but the embodiments may be configured by selectively combining all or part of each of the embodiments so that various modifications may be made.

Likewise, while depicting the actions in the drawings in a specific order, it should not be understood that such actions should be performed in that particular order or sequential order shown, or that all illustrated actions should be performed in order to obtain a desired result. In certain cases, multitasking and parallel processing may be advantageous.

Meanwhile, the control method of a moving robot according to an embodiment of the present invention may be implemented as a code that may be read by a processor on a recording medium that may be read by a processor. The processor-readable recording medium includes all types of recording devices that store data that may be read by the processor. In addition, the processor-readable recording medium is distributed over a computer system connected through a network, so that the processor-readable code may be stored and executed in a distributed manner.

In addition, although the preferred embodiments of the present invention have been illustrated and described above, the present invention is not limited to the specific embodiments described above, and. In addition, various modifications are possible by those of ordinary skill in the technical field to which the present invention belongs without departing from the gist of the present invention claimed in the claims, and these modifications should not be individually understood from the technical idea or prospect of the present invention.

Route planning and travelling of the prior art has a problem in that an efficiency is low and a large possibility of lawn damage. An object of the present invention is to minimize damage to the lawn and improve efficiency by minimizing visits to the same point.

An object of the present invention is to provide a moving robot with high efficiency and reliability in an outdoor environment and a control method thereof.

It is an object of the present invention to provide a moving robot and a control method thereof capable of reducing the possibility of lawn damage and improving efficiency in a wire method and a wireless method by minimizing an area that repeatedly travels independently of a wire.

Another object of the present invention is to provide a moving robot capable of effectively establishing a route according to a situation and a control method thereof.

In order to achieve the above or other objects, a moving robot and a control method thereof according to an aspect of the present invention may minimize damage to the lawn and improve efficiency by minimizing visits to the same point.

In order to achieve the above or other objects, a moving robot and a control method thereof according to an aspect of the present invention may minimize visits to the same point by reflecting the cost of a route passed during travelling in a later route plan.

In order to achieve the above or other objects, a moving robot according to an aspect of the present invention includes a body configured to define an exterior, a travelling unit configured to move the body against a travelling surface of a travelling area, a storage configured to store a grid map corresponding to a travelling area and cost information of grids included in the grid map, and a controller configured to generate a movement route based on the cost information, control the travelling unit to travel according to the generated movement route, and increase a stay cost of a grid corresponding to a route that has passed during the travelling and control the storage to store the increased stay cost.

Meanwhile, the cost information may include an intrinsic cost assigned based on environmental information of the travelling area, and the stay cost.

In addition, the stay cost may be separately stored in a stay map composed of grids corresponding to the travelling area and stay costs of each grid.

Alternatively, the intrinsic cost and the stay cost may be stored on the grid map.

Meanwhile, the controller may calculate a travelling cost by summing the intrinsic cost, the stay cost, and an adjacent cost with respect to a distance generated when moving from a starting point to an arrival point, and may generate movement route as a route with minimum travelling cost.

In addition, the controller may increase the stay cost equal to a difference value of adjacent costs between two adjacent grids during one travelling.

In addition, the adjacent cost may be proportional to the moving distance.

Meanwhile, the controller may initialize all stay costs when the stay cost of any one grid exceeds a minimum value of the intrinsic cost.

Meanwhile, the intrinsic cost may be set to a first value for a risk area corresponding to a fixed object or a border line and a second value lower than the first value for a predicted risk area adjacent to the risk area. In this case, the controller may initialize all stay costs when the stay cost of any one grid is equal to or greater than the second value.

In order to achieve the above or other objects, a method of controlling a moving robot according to an aspect of the present invention comprises: setting cost information on grids of a grid map corresponding to a travelling area, travelling based on the cost information, and, increasing and storing a stay cost of a grid corresponding to a route passed during the travelling.

Meanwhile, the cost information may include an intrinsic cost assigned based on environmental information of the travelling area, and the stay cost.

In addition, the stay cost may be separately stored in a stay map composed of grids corresponding to the travelling area and stay costs of each grid.

Alternatively, the intrinsic cost and the stay cost may be stored on the grid map.

In order to achieve the above or other objects, the method for controlling a moving robot according to an aspect of the present invention may further include calculating a travelling cost by summing the intrinsic cost, the stay cost, and an adjacent cost with respect to a distance generated when moving from a starting point to an arrival point, and generating movement route as a route with minimum travelling cost.

In addition, the increasing and storing the stay cost may increase the stay cost equal to a difference value of adjacent costs between two adjacent grids during one travelling.

Meanwhile, the adjacent cost may be proportional to the moving distance.

In order to achieve the above or other objects, the method for controlling a moving robot according to an aspect of the present invention may further include initializing all stay costs when the stay cost of any one grid becomes more than a minimum value of the intrinsic cost.

Meanwhile, the intrinsic cost may be set to a first value for a risk area corresponding to a fixed object or a border line and a second value lower than the first value for a predicted risk area adjacent to the risk area, and further include initializing all stay costs when the stay cost of any one grid is equal to or greater than the second value.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a body;
   a travelling unit configured to move the body over a travelling surface of a travelling area;
   a storage configured to store a grid map corresponding to the travelling area and cost information of a plurality of grids included in the grid map; and
   a controller configured to:
      provide a movement route of the travelling area based on the cost information,
      control the travelling unit such that the body is to move over the traveling area based on the movement route,
      increase a stay cost of at least one grid corresponding to a route that has passed during the movement of the robot over the travelling area, and
      control the storage to store the increased stay cost, and
   wherein the cost information includes an intrinsic cost based on environmental information of the travelling area, and the stay cost of the at least one grid,
   wherein the controller is configured to initialize all stay costs when the stay cost of one grid exceeds a minimum value of the intrinsic cost.

2. The robot of claim 1,
   wherein the stay cost is stored with respect to a stay map composed of grids corresponding to the travelling area, and a separate stay cost is associated with respect to each of the grids.

3. The robot of claim 1,
   wherein the intrinsic cost and the stay cost are stored with respect to the grid map.

4. The robot of claim 1,
   wherein the controller is configured to determine a travelling cost based on the intrinsic cost, the stay cost, and an adjacent cost based on a distance when the robot is to move from a starting point to an arrival point of the traveling area, and the controller is configured to provide a movement route having a minimum travelling cost with respect to the travelling area.

5. The robot of claim 4,
   wherein the controller is configured to increase the stay cost based on a difference of adjacent costs between two adjacent grids during one movement of the robot from the starting point to the arrival point of the travelling area.

6. The robot of claim 4,
   wherein the adjacent cost is proportional to the distance.

7. The robot of claim 1,
   wherein the intrinsic cost is set based on a first value with respect to a risk area corresponding to a fixed object or a border line and a second value, less than the first value, with respect to a predicted risk area adjacent to the risk area.

8. The robot of claim 7,
   wherein the controller is configured to initialize all stay costs when the stay cost of one grid is equal to or greater than the second value.

9. A method of controlling a robot, the method comprising:
   providing cost information for a plurality of grids of a grid map corresponding to a travelling area;
   moving the robot over the travelling area based on the cost information; and
   increasing and storing a stay cost of at least one grid corresponding to a route passed during the moving of the robot over the travelling area, and
   wherein the cost information includes an intrinsic cost based on environmental information of the travelling area, and the stay cost of the at least one grid, and
   further comprising:
      initializing all stay costs when the stay cost of one grid exceeds a minimum value of the intrinsic cost.

10. The method of claim 9,
    wherein the stay cost is stored with respect to a stay map composed of grids corresponding to the travelling area, and a separate stay cost is associated with respect to each of the grids.

11. The method of claim 9,
    wherein the intrinsic cost and the stay cost are stored with respect to the grid map.

12. The method of claim 9, further comprising:
    determining a travelling cost based on the intrinsic cost, the stay cost, and an adjacent cost based on a distance when the robot is to move from a starting point to an arrival point of the travelling area, and providing a movement route having a minimum travelling cost with respect to the travelling area.

13. The method of claim 12,
    wherein the increasing and storing of the stay cost may increase the stay cost based on a difference of adjacent costs between two adjacent grids during one movement of the robot from the starting point to the arrival point to the travelling area.

14. The method of claim 12,
    wherein the adjacent cost is proportional to the distance.

15. The method of claim 9,
    wherein the intrinsic cost is set based on a first value with respect to a risk area corresponding to a fixed object or a border line and a second value, less than the first value, with respect to a predicted risk area adjacent to the risk area.

16. The method of claim 15, further comprising:
    initializing all stay costs when the stay cost of one grid is equal to or greater than the second value.

* * * * *